United States Patent
Andersson

(10) Patent No.: US 9,367,219 B2
(45) Date of Patent: Jun. 14, 2016

(54) PROCESSING AN INFRARED (IR) IMAGE BASED ON SWIPE GESTURES

(71) Applicant: FLIR Systems AB, Täby (SE)

(72) Inventor: Mattias Andersson, Johanneshov (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 14/792,529

(22) Filed: Jul. 6, 2015

(65) Prior Publication Data
US 2015/0309707 A1  Oct. 29, 2015

Related U.S. Application Data

(63) Continuation of application No. 14/575,110, filed on Dec. 18, 2014.

(60) Provisional application No. 61/991,394, filed on May 9, 2014, provisional application No. 61/917,796, filed on Dec. 18, 2013.

(51) Int. Cl.
| | |
|---|---|
| G06F 3/0484 | (2013.01) |
| G06F 3/0488 | (2013.01) |
| H04N 5/33 | (2006.01) |
| G06T 7/00 | (2006.01) |
| G06T 11/00 | (2006.01) |

(52) U.S. Cl.
CPC .......... *G06F 3/04842* (2013.01); *G06F 3/0488* (2013.01); *G06F 3/04883* (2013.01); *G06F 3/04886* (2013.01); *G06T 7/0081* (2013.01); *G06T 11/001* (2013.01); *H04N 5/33* (2013.01); *G06F 3/0484* (2013.01); *G06F 2203/04803* (2013.01); *G06T 2207/10024* (2013.01); *G06T 2207/10048* (2013.01); *G06T 2207/20092* (2013.01); *G06T 2207/20141* (2013.01)

(58) Field of Classification Search
CPC ............. G06F 3/00; G06F 3/01; G06F 3/017; G06F 3/041; G06F 3/048; G06F 3/0482; G06F 3/0484; G06F 3/0488; G06F 3/04842; G06F 3/04883; G06T 7/00; G06T 7/0002; G06T 7/0081; G06T 11/00; G06T 2207/10024; G06T 2207/10048
See application file for complete search history.

(56) References Cited

U.S. PATENT DOCUMENTS

| | | | |
|---|---|---|---|
| 7,732,768 B1 | 6/2010 | Haigh et al. | |
| 2008/0144905 A1 | 6/2008 | Tallman | |
| 2010/0265332 A1 | 10/2010 | George-Svahn et al. | |
| 2010/0309315 A1* | 12/2010 | Hogasten | H04N 5/33 348/164 |
| 2012/0078113 A1 | 3/2012 | Whitestone et al. | |
| 2015/0172545 A1* | 6/2015 | Szabo | H04N 5/23238 348/36 |
| 2015/0334315 A1* | 11/2015 | Teich | H04N 5/2257 348/164 |

* cited by examiner

*Primary Examiner* — Xiomar L Bautista
(74) *Attorney, Agent, or Firm* — Haynes and Boone, LLP

(57) ABSTRACT

A method and a system for displaying an infrared (IR) image and/or a related image on a touch screen are provided. For example, a method may include: displaying, on a touch screen, an image of a scene; partitioning the image into a first part and a second part in response to a user indication made on the touch screen; displaying the first part of the image in an IR image mode using an IR image of the scene capture by an IR imaging sensor; and displaying the second part of the image in a non-IR image mode. The non-IR image mode may include a visible light (VL) image mode for displaying a VL image of the scene, or a fusion image mode for displaying a combination of the IR image and the VL image. The partitioning may be adjusted in response to a swipe gesture made on the touch screen.

20 Claims, 24 Drawing Sheets

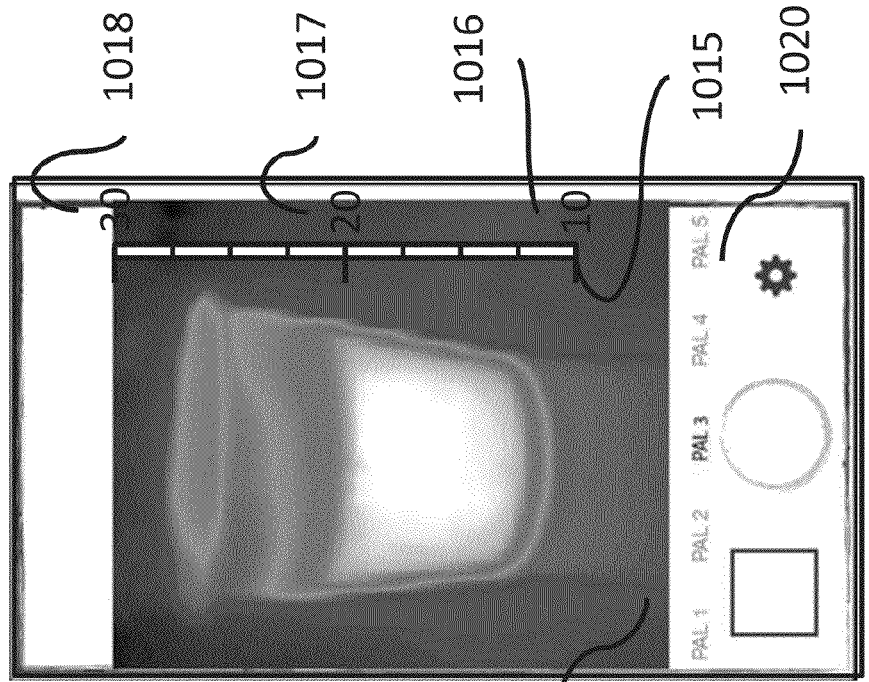
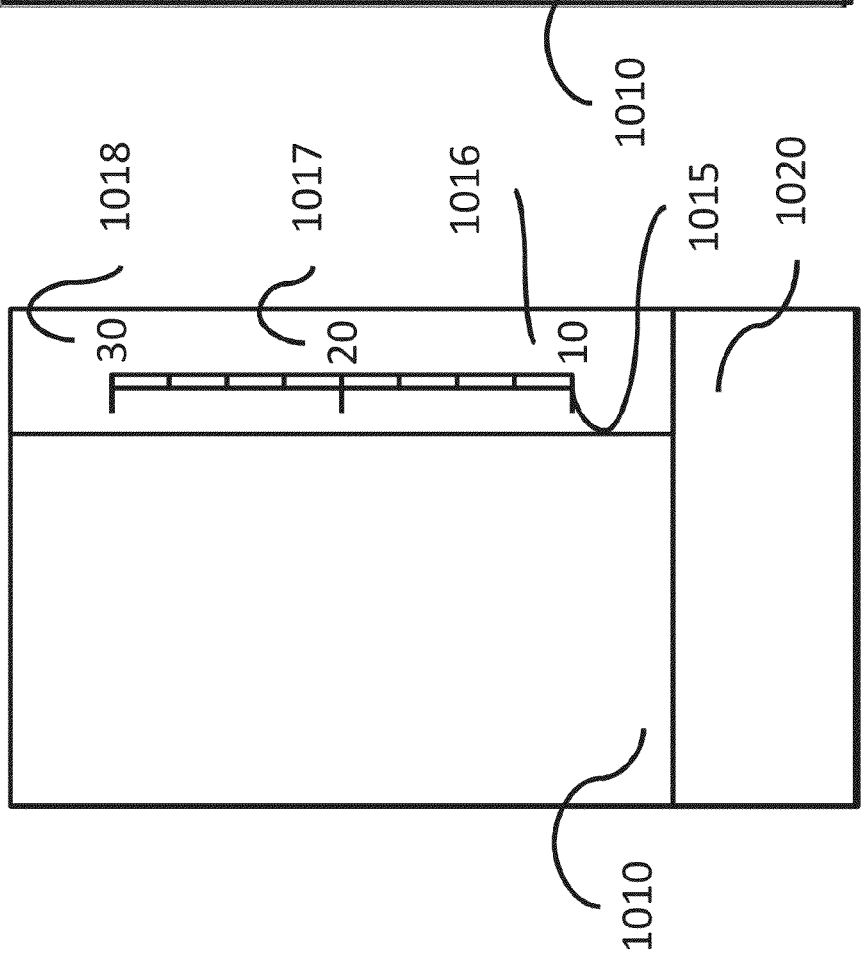

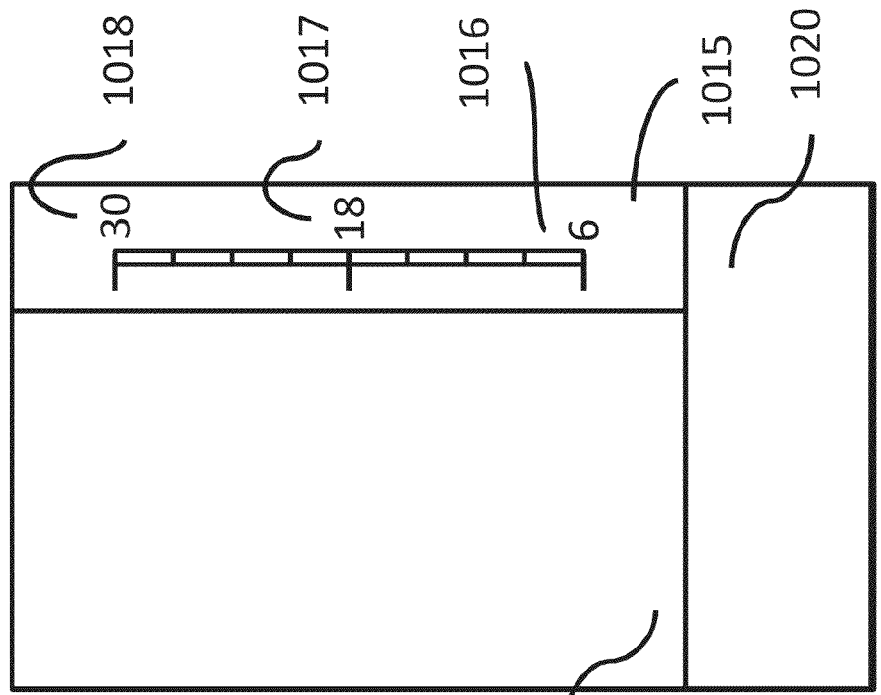
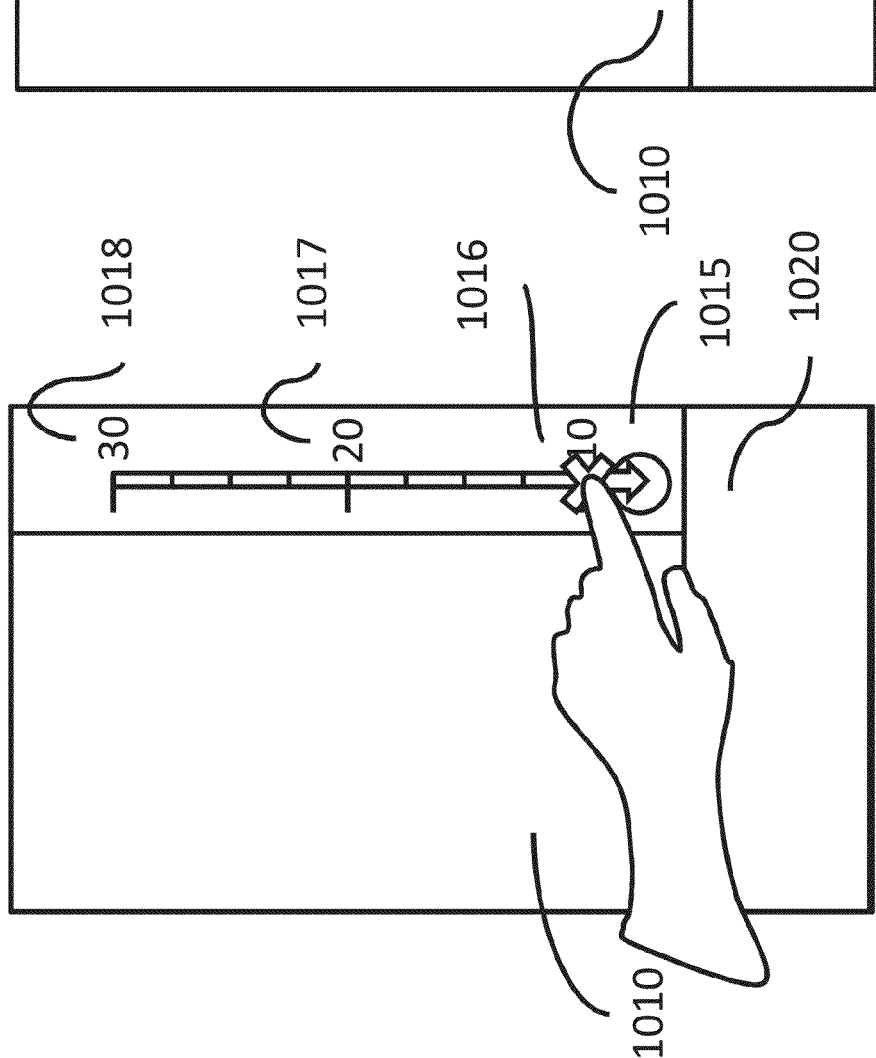

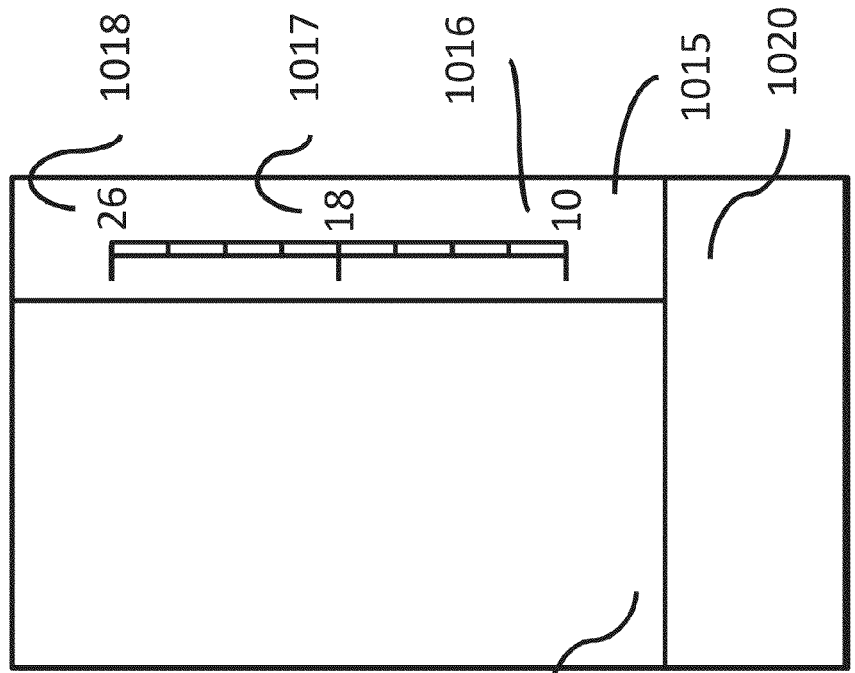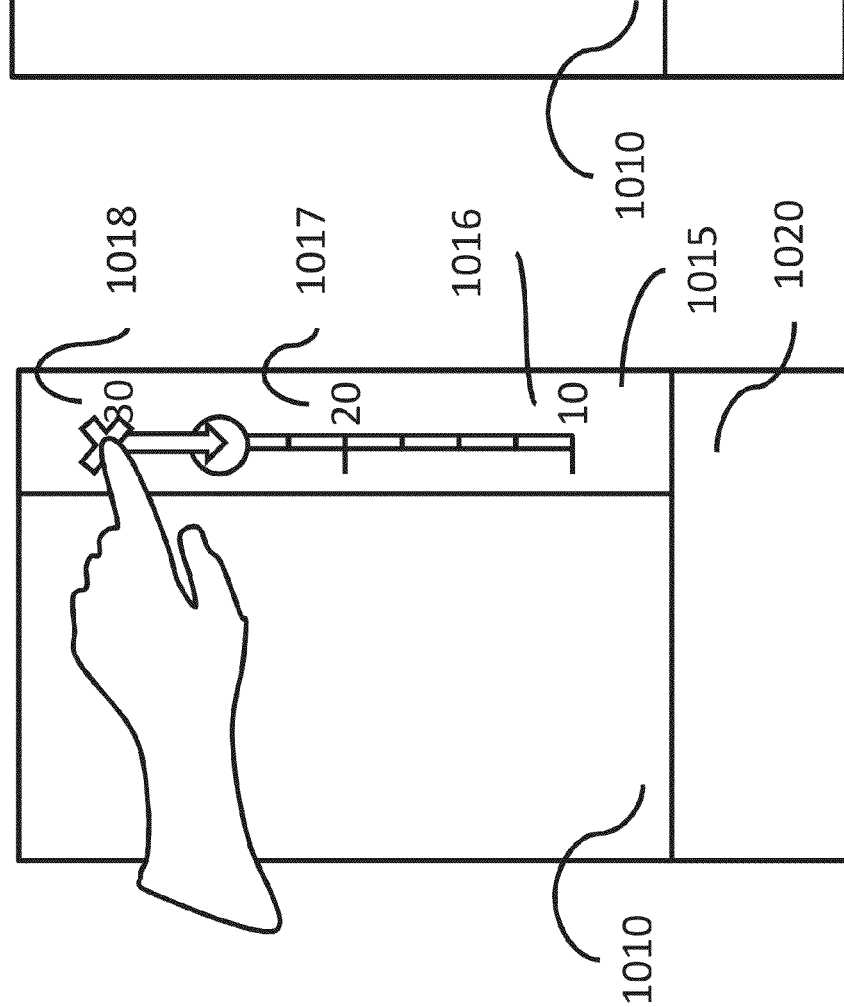
Figure 12b
Figure 12a

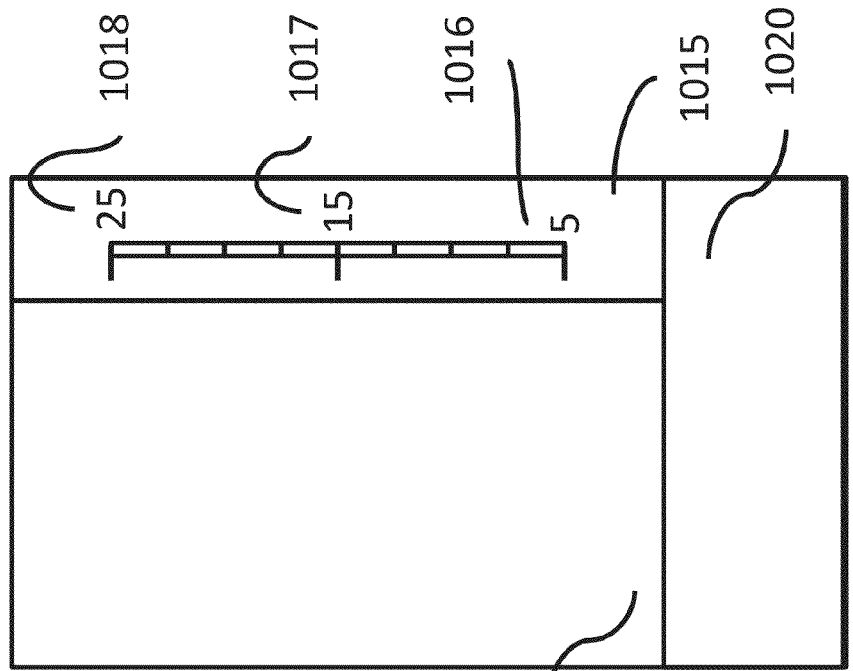
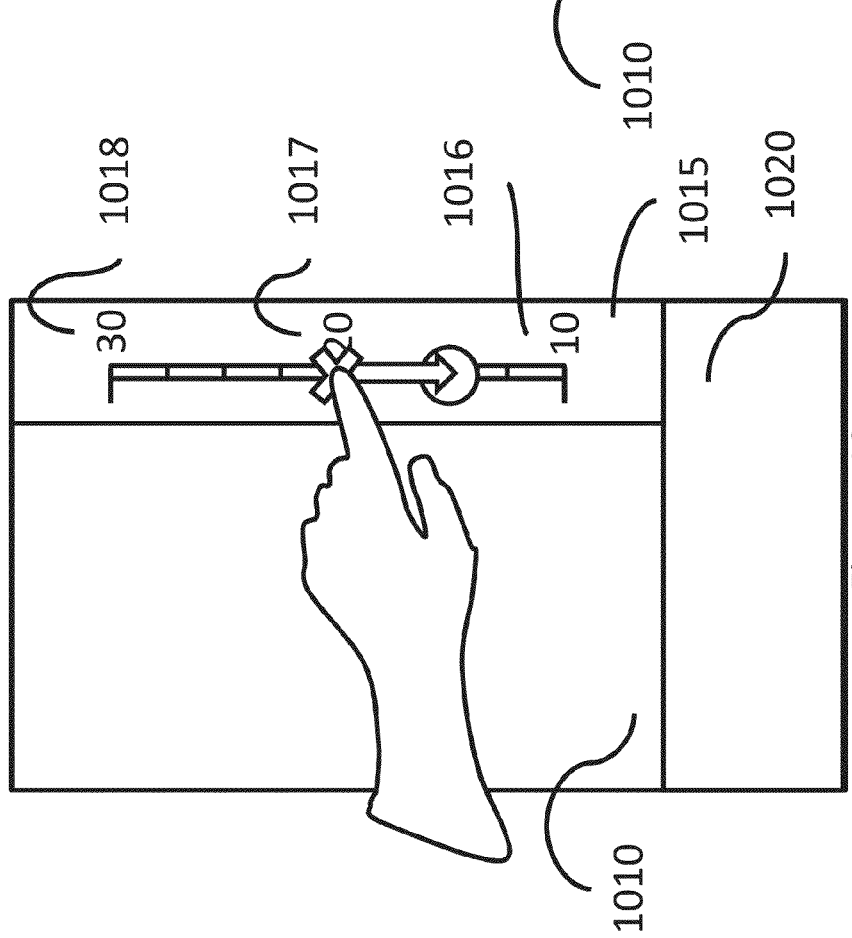

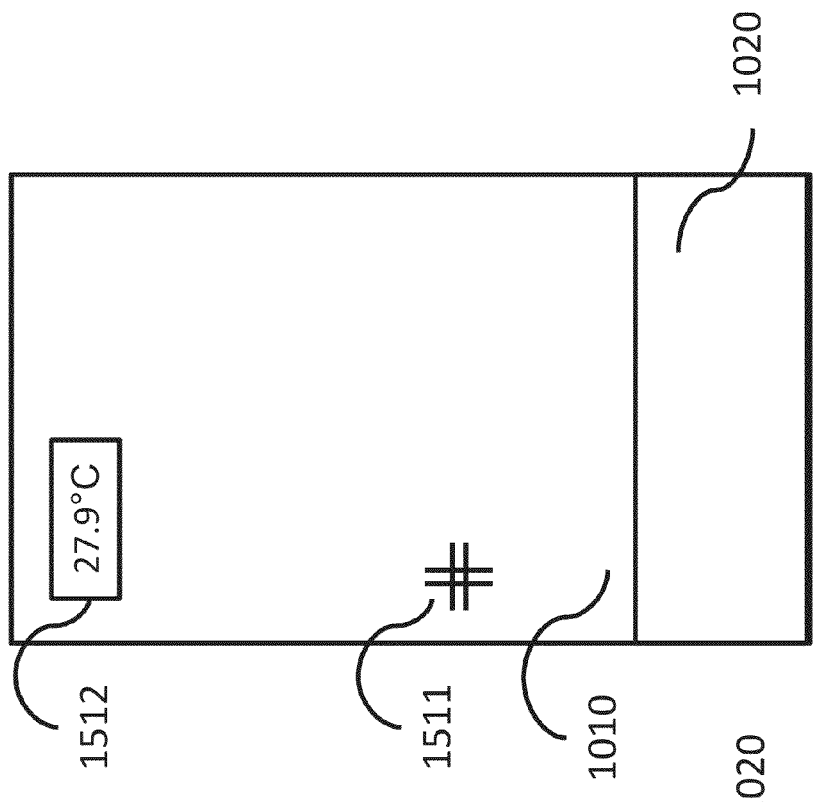
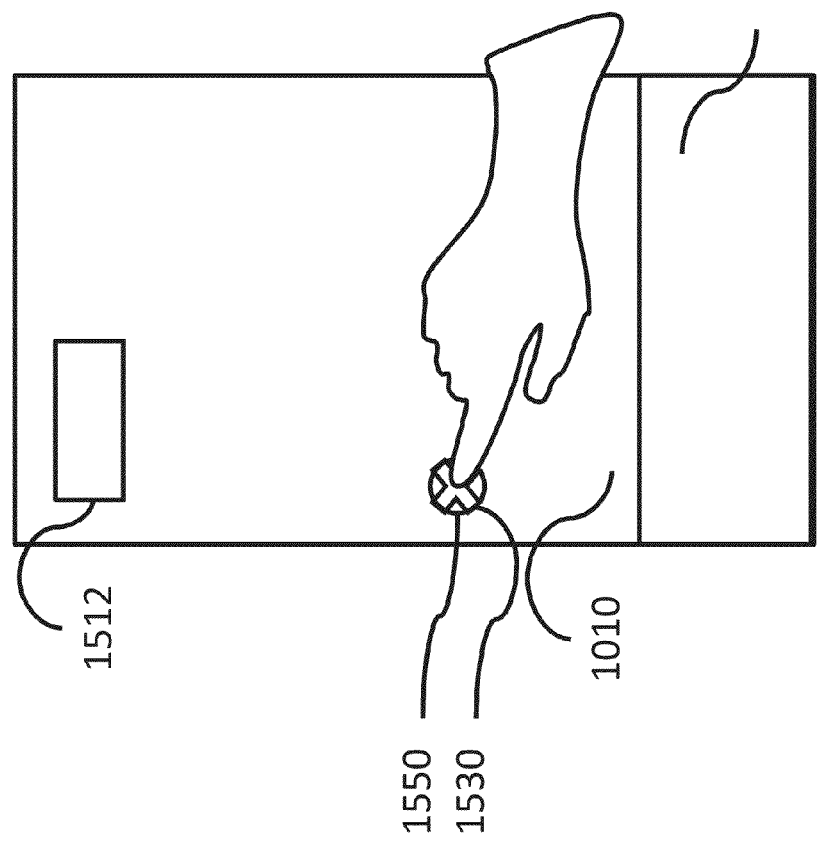

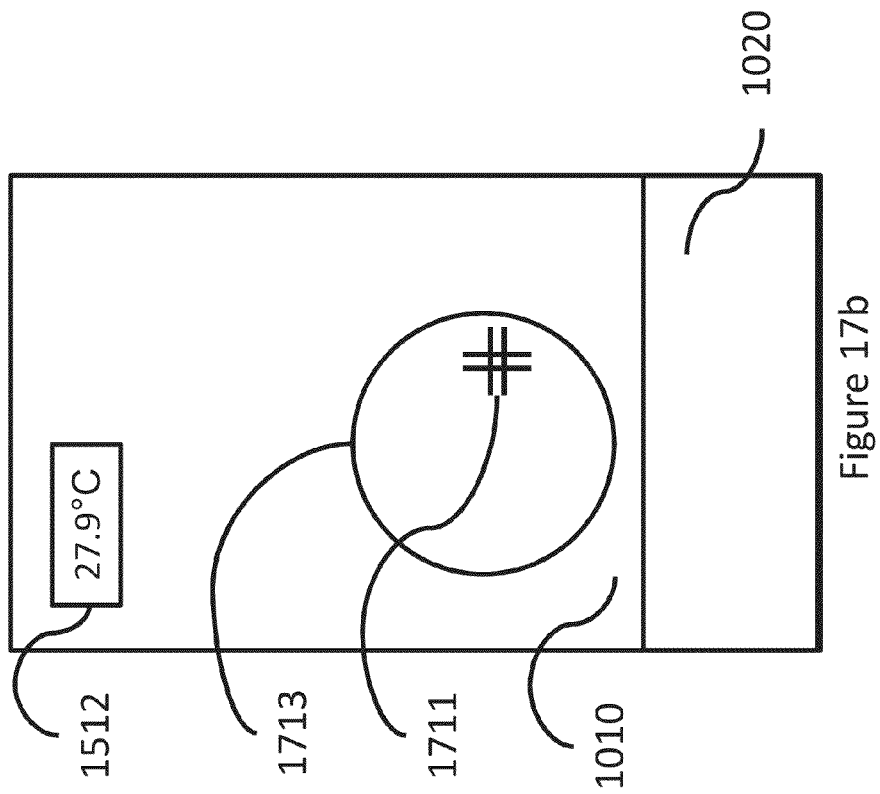
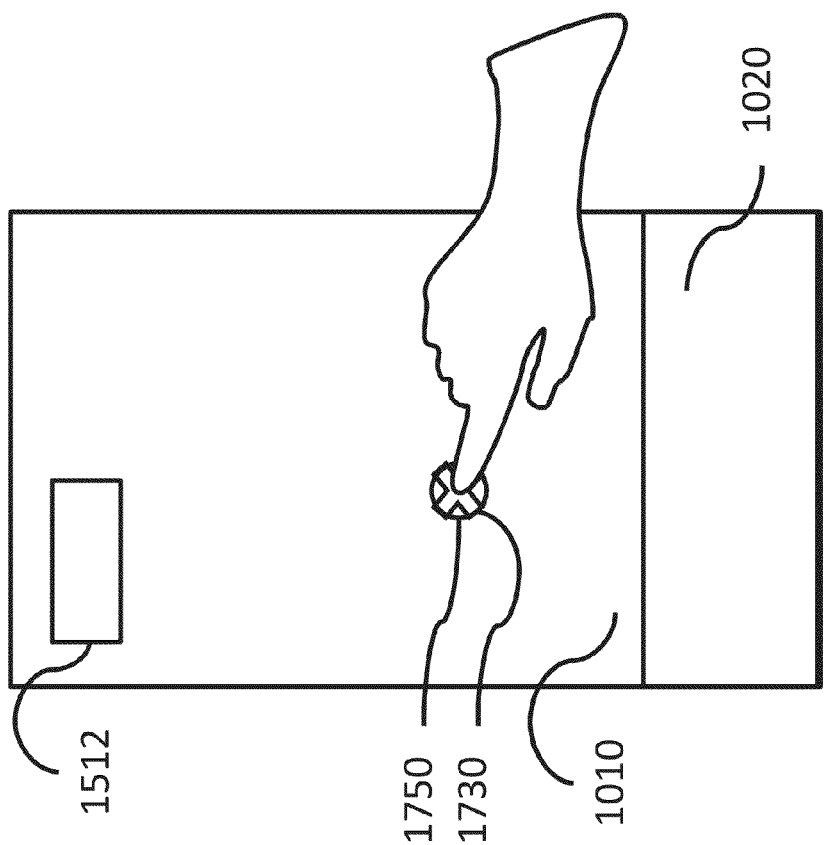

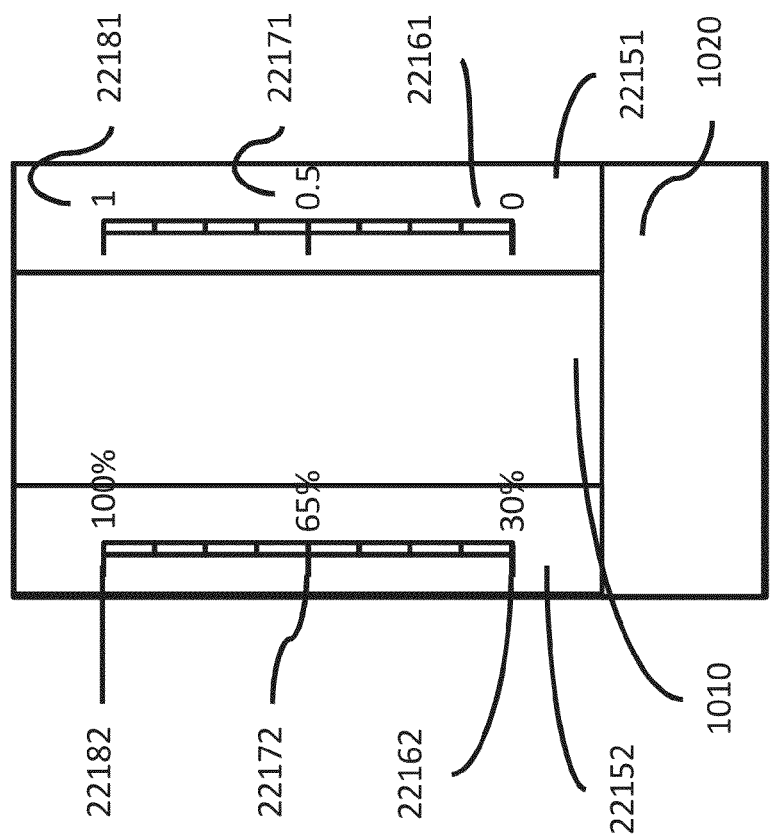
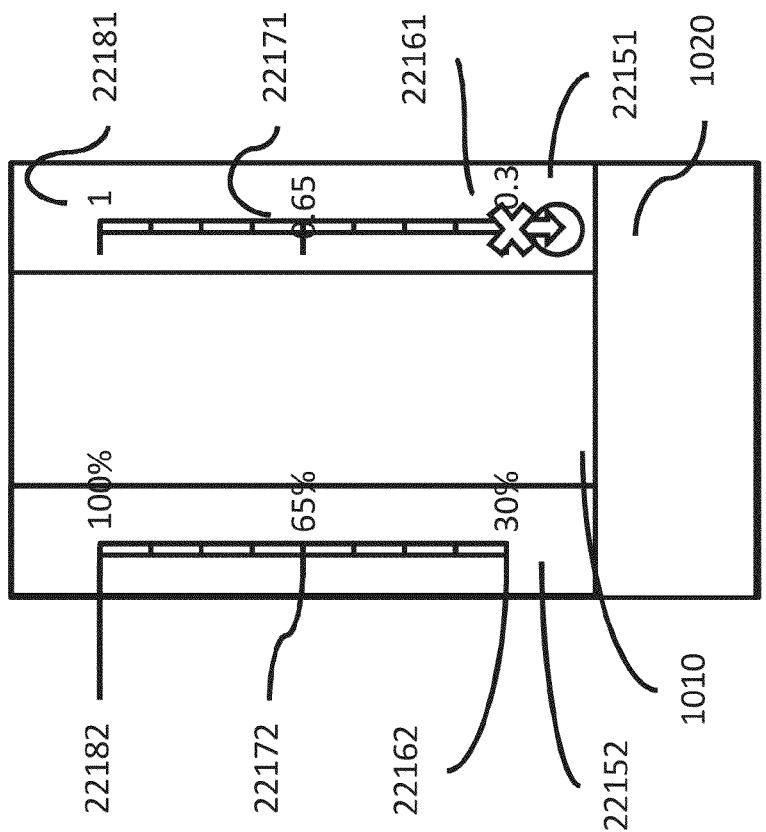

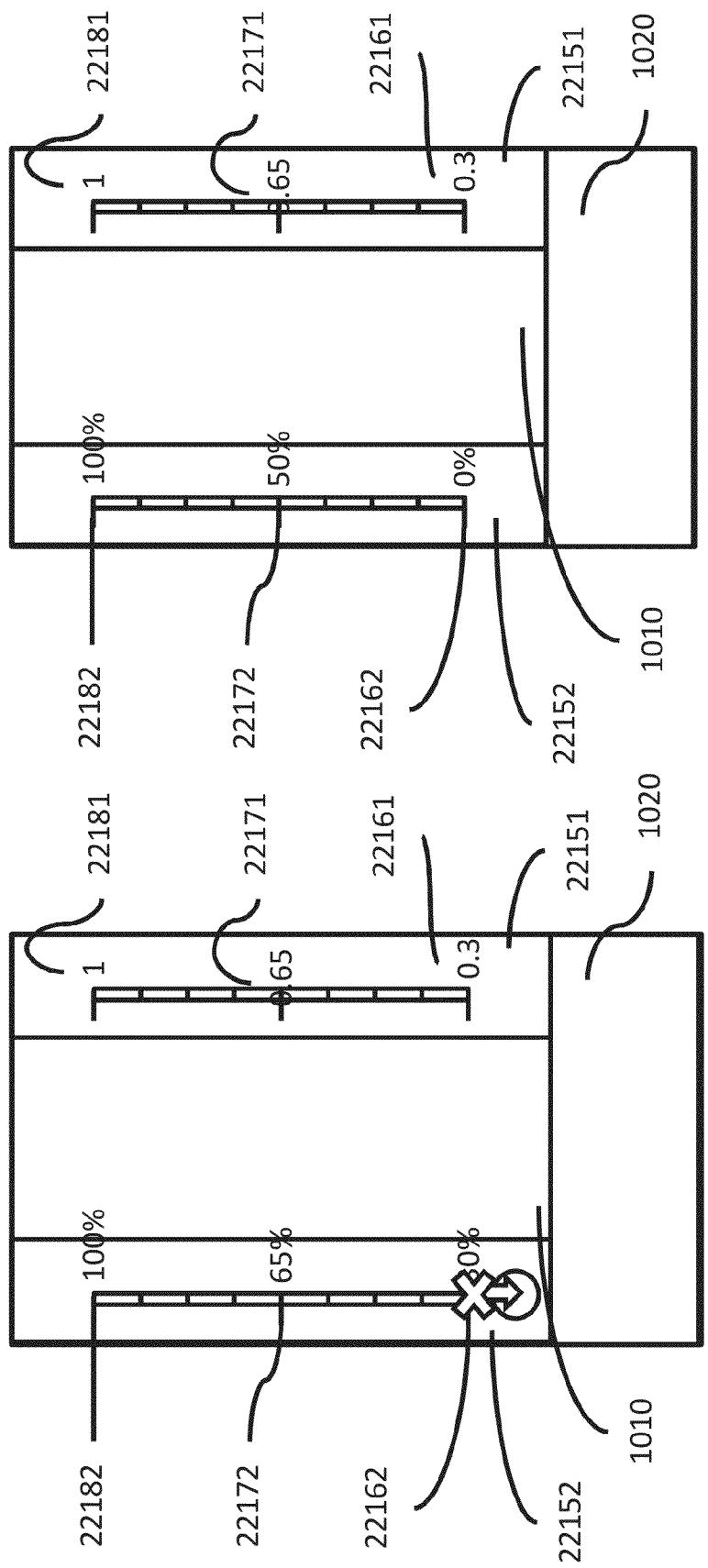

PROCESSING AN INFRARED (IR) IMAGE BASED ON SWIPE GESTURES

CROSS-REFERENCE TO RELATED APPLICATIONS

This application is a continuation of U.S. patent application Ser. No. 14/575,110 filed Dec. 18, 2014 and entitled "PROCESSING AN INFRARED (IR) IMAGE BASED ON SWIPE GESTURES" which is hereby incorporated by reference in its entirety. U.S. patent application Ser. No. 14/575,110 claims the benefit of U.S. Provisional Patent Application No. 61/991,394 filed May 9, 2014 and entitled "PROCESSING AN INFRARED (IR) IMAGE BASED ON SWIPE GESTURES" which is hereby incorporated by reference in its entirety. U.S. patent application Ser. No. 14/575,110 also claims the benefit of U.S. Provisional Patent Application No. 61/917,796 filed Dec. 18, 2013 and entitled "PROCESSING AN INFRARED (IR) IMAGE BASED ON SWIPE GESTURES" which is hereby incorporated by reference in its entirety.

TECHNICAL FIELD

Generally, embodiments of the invention relate to the technical field of image processing and visualization of infrared (IR) images, and in particular, to image processing and visualization of infrared (IR) images for image analysis using swipe gestures.

BACKGROUND

Thermal, or infrared (IR), images of scenes are often useful for monitoring, inspection and/or maintenance purposes.

Typically, a thermal imaging device, e.g. in the form of a thermography arrangement or an infrared IR camera, is provided to capture infrared (IR) images as IR image data values, representing infrared radiation emitted from an observed real world scene. The captured IR image can after capturing be displayed or visualized and analyzed on a display in a computer system such as a thermography arrangement, infrared IR camera, smartphone, tablet computer, laptop computer, desktop computer or a wrist-worn computer configured with a touch screen with a touch based user input functionality.

As infrared radiation is not visible to the human eye there are no natural relation between the captured infrared (IR) image's data values of each pixel in an IR image and grey-scale or colors displayed on a display. Therefore an information visualization image processing referred to as false color or pseudo color is used to map captured infrared (IR) image data values of each pixel in an IR image to a palette used to present the corresponding pixel displayed on a display, e.g. using grey-scale or colors.

Further, as IR images by nature are generally low contrast and noisy, the captured IR image may be subjected to further imaging processing in to improve the interpretability of the image before displaying it to a user, such as filtering or combination/fusion with visual light images captured of the same observed real world scene.

Applying an appropriate imaging processing to an IR image for display to a user is a cumbersome process as the requirements may vary significantly with the observed real world scene, objects of interest in the observed real world scene, the type of application or use case and user preference.

There is therefore a need to reduce complexity and time for a user to find an appropriate imaging processing to apply to an IR image for display to a user, in particular in a computer system configured with a touch screen with a touch based user input functionality. Thereby the interpretability of an IR image is improved and particular aspects or details of the image may be analyzed.

SUMMARY

Various techniques are provided for a computer system and a computer-implemented method to process an infrared (IR) image based on a swipe gesture. For example, the method includes displaying an IR image on a touch screen, wherein the IR image is displayed within a first graphical object of one or more graphical objects displayed within said touch screen; receiving, by a processor communicatively coupled to said touch screen, a user indication of a swipe gesture via said touch screen, wherein said receiving the user indication comprises generating first data representing a first swipe gesture starting location and second data representing a first swipe gesture direction; processing the one or more graphical objects based on the first and the second data, wherein the processing comprises at least one of: (i) splitting said IR image within the first graphical object into a first and second parts to process the first or the second part, (ii) modifying a size of a second graphical object to a predefined expanded size or a predefined minimized size, (iii) modifying a temperature range for processing the IR image, or (iv) modifying one or more parameter ranges for processing the IR image; and displaying said processed one or more graphical objects within said touch screen.

In another embodiment, a method may include: displaying an IR image within a first graphical object displayed in a first set of non-overlapping graphical objects within a touch screen by applying a first palette, receiving a user indication of a swipe gesture via said touch screen, wherein receiving a user indication further comprises generating first data representing a first swipe gesture starting location and second data representing a first swipe gesture direction, splitting said IR image into two parts based on said first data, wherein the two parts comprise a first part and a second part, selecting said first part or said second part based on said second data, image processing said selected first part or second part based on said second data, displaying said image processed first part or displaying said image processed second part overlaid onto said displayed IR image within said touch screen.

In another embodiment, a method may include: displaying a graphical object within a touch screen, wherein said graphical object represents a temperature range for processing an IR image, and wherein the graphical object comprises one or more portions each associated with a temperature value from the temperature range; receiving, by a processor communicatively coupled to said touch screen, a user indication of a swipe gesture via said touch screen, wherein said receiving the user indication comprises generating first data representing a swipe gesture starting location and second data representing a swipe gesture direction, and wherein said swipe gesture starting location corresponds to one of the portions of the graphical object; modifying said first temperature range based on said first data and said second data, wherein said modifying said temperature range comprises modifying one or more of a minimum temperature value, a middle temperature value, and a maximum temperature value of said temperature range; processing said IR image based on said modified temperature range; and displaying said processed IR image within said touch screen.

In another embodiment, a method may include: displaying the IR image on a touch screen, wherein the IR image is displayed within a first graphical object displayed within the touch screen; receiving, by a processor communicatively coupled to said touch screen, a user indication of a swipe gesture via said touch screen, wherein said receiving the user indication comprises generating first data representing a swipe gesture starting location and second data representing a swipe gesture direction, and wherein said second data indicates that the user indication corresponds to a stationary swipe; determining, based at least in part on the first data representing the swipe gesture starting location, a spot marker location for selecting a pixel or group of pixels of the IR image displayed within the first graphical object; displaying a second graphical object representing a spot marker by overlaying the second graphical object onto the IR image at the spot marker location; and processing said IR image based on the spot marker location.

In another embodiment, a method may include: displaying a first graphical object comprising the IR image within a touch screen; displaying a second graphical object within said touch screen, wherein said second graphical object is overlaid onto the first graphical object; receiving, by a processor communicatively coupled to said touch screen, a user indication of a swipe gesture via said touch screen, wherein said receiving the user indication comprises generating first data representing a swipe gesture starting location and second data representing a swipe gesture direction, and wherein the swipe gesture starting location corresponds to a coordinate associated with said second graphical object; and modifying said second graphical object based on said first data and said second data, wherein modifying said second graphical object comprises modifying the size of the second graphical object to a predefined expanded size or a predefined minimized size.

In another embodiment, a method may include: displaying the IR image on a touch screen based on a first parameter range and a second parameter range, wherein the IR image is displayed within a first graphical object displayed within the touch screen; displaying a second graphical object and a third graphical object within said touch screen, wherein said second graphical object represents the first parameter range and comprises one or more portions each associated with a parameter value from the first parameter range, and wherein said third graphical object represents the second parameter range and comprises one or more portions each associated with a parameter value from the second parameter range; receiving, by a processor communicatively coupled to said touch screen, a user indication of a swipe gesture via said touch screen, wherein said receiving the user indication comprises generating first data representing a swipe gesture starting location and second data representing a swipe gesture direction, and wherein the swipe gesture starting location corresponds to one of the portions of the second or the third graphical object; modifying said first or said second parameter range based on said first data and said second data, wherein said modifying said first or said second parameter range comprises modifying one or more of a minimum parameter value, a middle parameter value, and a parameter temperature value of said first or said second parameter range; processing said IR image based on said modified first or said modified second parameter range; and displaying said processed IR image within said touch screen.

In another embodiment, a non-transitory computer readable medium may store computer readable code which, when executed by a processor, causes the processor to perform the various methods of processing an infrared (IR) image based on a swipe gesture discussed above.

In another embodiment, a computer system may include: a memory; a touch screen; and a processor communicatively coupled to the memory and the touch screen, wherein said processor is configured to: display an IR image on said touch screen, wherein the IR image is displayed within a first graphical object of one or more graphical objects displayed within said touch screen, receive a user indication of a swipe gesture via said touch screen, wherein said receiving the user indication comprises generating first data representing a first swipe gesture starting location and second data representing a first swipe gesture direction, process the one or more graphical objects based on the first and the second data by performing one or more operations comprising at least one of: (i) splitting said IR image within the first graphical object into a first and second parts to process the first or the second part, (ii) modifying a size of a second graphical object to a predefined expanded size or a predefined minimized size, (iii) modifying a temperature range for processing the IR image, or (iv) modifying one or more parameter ranges for processing the IR image; and display said processed one or more graphical objects within said touch screen.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

Embodiments of the invention will now be described in more detail with reference to the appended drawings, wherein:

FIGS. 10a and 10b show example images of an IR image and an associated temperature range that may be displayed within a touch screen, in accordance with an embodiment of the disclosure.

FIGS. 11a, 11b, 12a, 12b, 13a, and 13b show touch screen images illustrating various examples of how a swipe gesture from a user may be received to modify a temperature range for processing or presenting an IR image, in accordance with one or more embodiments of the disclosure.

FIGS. 15a, 15b, 16a, 16b, 17a, and 17b show touch screen images illustrating various examples of how a user indication of a swipe gesture may be received to place or otherwise control a spot marker for processing an IR image, in accordance with one or more embodiments of the disclosure.

FIGS. 22a, 22b, 23a, and 23b show touch screen images illustrating various example of how a swipe gesture from a user may be received to adjust one of a plurality of parameters that control or affect processing and/or presentation of an IR image, in accordance with one or more embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Introduction

Figure 1:
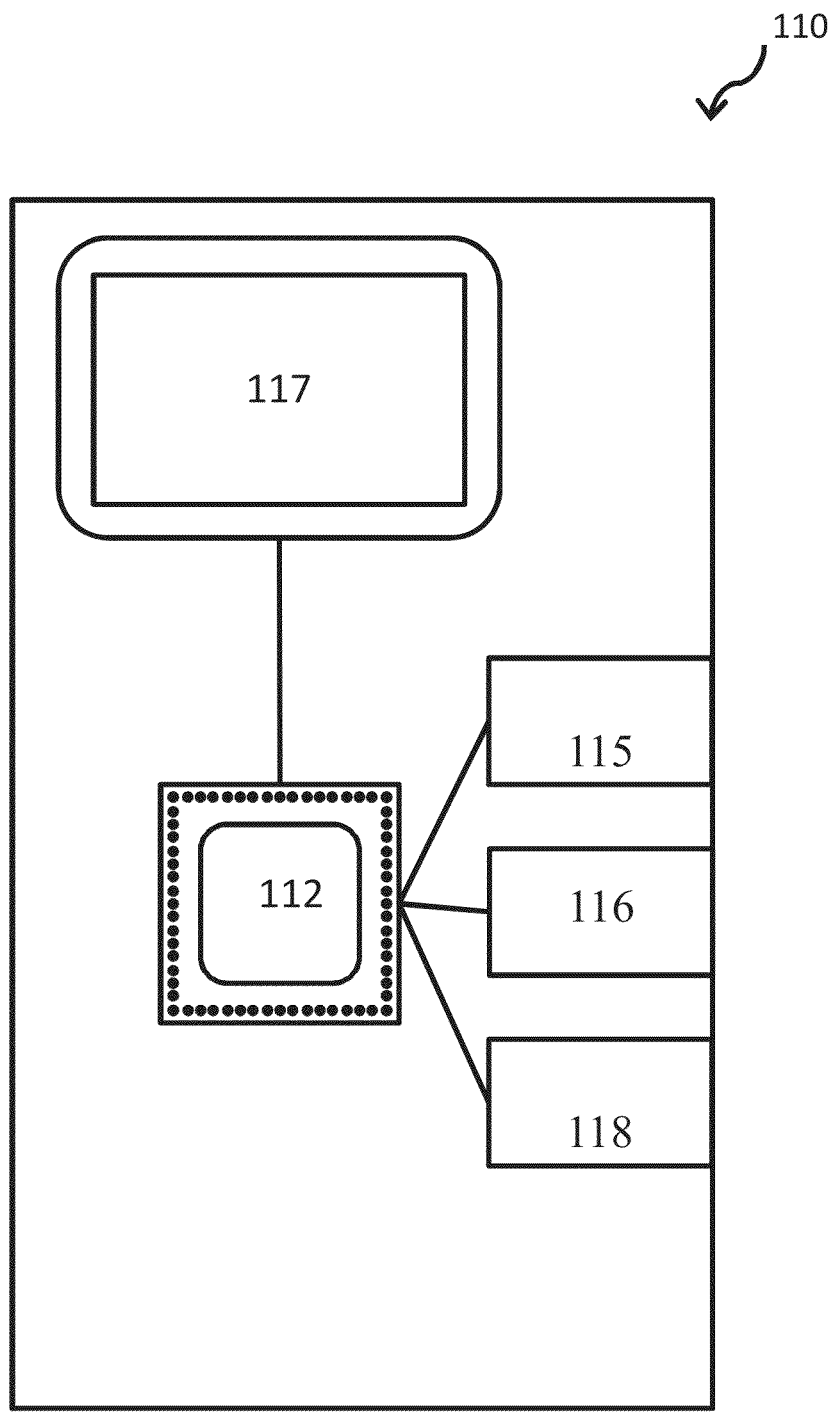
FIG. 1 shows a schematic view of a computer system in accordance with one or more embodiments of the present disclosure.

The invention relates to image analysis of IR images based on image processing and visualization of infrared (IR) images for image analysis using swipe gestures in a computer system.

After capturing an IR image by imaging systems integrated in or coupled to a computer system, a user typically analyzes the image, e.g. to detect electric faults, heat emission or gas emission. The analysis may be performed in a thermography arrangement, infrared IR camera, smartphone, tablet computer, laptop computer, desktop computer or a wrist-worn computer configured with a touch screen with a touch based user input functionality.

As IR images typically are noisy and low contrast, the user may have to apply various image processing operations to be identifying areas of interest, such as overheated electrical components, faulty wall insulation or gas leaks.

By applying a different palette or by applying a different image mode, such areas of interest may be visualized more clearly to the user, and thus improving the analysis of the IR image.

To apply image processing, e.g. apply a different palette or to apply a different image mode, in conventional systems is a cumbersome and time consuming process, that may include substantial menu navigation and parameter updates. Another problem is the delay between when a user first observes an IR image where a first palette has been applied and when the user observes the updated IR image where a second palette has been applied. Yet another problem is that no comparison between the visualizations is available.

The invention disclosed herein addresses the problems listed above and other problems related to analysis of IR images based on image processing and visualization of infrared (IR) images for image analysis.

Applying a Palette to an Image or IR Image

As thermal images by nature are generally low contrast and noisy, the captured IR image may be subjected to various imaging processing in to improve the interpretability of the image before displaying it to a user. Examples of such image processing is correction with IR temperature calibration data parameters, low pass filtering, registration of multiple successive IR images and averaging to obtain a averaged IR image or any other IR image processing operation known to a person skilled in the art.

As infrared radiation is not visible to the human eye there are no natural relation between the captured infrared (IR) image's data values of each pixel in an IR image and grey-scale or colors displayed on a display. Therefore an information visualization process referred to as false color or pseudo color is used to map captured infrared (IR) image data values of each pixel in an IR image to a palette used to present the corresponding pixel displayed on a display, e.g. using grey-scale or colors.

A palette is typically a finite set of color or grey-scale representations selected from a color model for the display of images or visual representations of IR images, i.e. a pre-defined palette represents a finite set of grayscale or color values of a color model displayable on a display thereby making it visible to the human eye.

Mapping of captured infrared (IR) image data values of each pixel in an IR image to a palette also referred to as applying a palette, used to present the corresponding pixel of a visual representation of said IR image displayed on a display is typically performed by applying a pre-determined relation, wherein said pre-determined relation describes a mapping from intervals of infrared image data values to said pre-defined palette, e.g. a palette index value with an associated color or grey-scale representation selected from a color model.

The captured IR image is typically displayed to an intended user based on the captured IR image comprising infrared (IR) image data values, IR temperature calibration data parameters, a predefined palette representing a finite set of grayscale or color values of a color model displayable on a display and a pre-determined relation describing a mapping from infrared image data values to said pre-defined palette.

The same method of applying a palette to an image may be used for any type of image, as would be understood by a person skilled in the art.

Image Mode

An IR image may in some embodiments comprise additional information related to the observed real world scene. Example of such related information may be a visible light (VL) image (also referred to as a visual light image) depicting the same real world scene, a blueprint or drawing of the observed real world scene, a distance map describing estimated distances to the observed real world scene, GPS coordinates, ambient temperature, moisture levels or other information related to the observed real world scene. Such an IR image containing additional information may also be referred to as a multilayer image.

The additional information may be either displayed or visualized alone or be combined through image processing with the IR image as a combined image and displayed or visualized. Such display of additional information alone or as a combined image is referred herein as an image mode of the IR image.

Such image modes of the IR image may image processed beforehand and stored as an IR image or image processed instantaneously when applying an image mode to an IR image.

One example of an image mode is VL only, wherein only additional information from a VL image is displayed as an IR image within a first graphical object displayed in a first set of non-overlapping graphical objects within a screen (e.g., a touch screen), as would be understood by a person skilled in the art.

Yet another example of an image mode is fusion, wherein IR image data values additional information from a VL image is aligned, superimposed and combined as a combined image by fusing or blending, e.g. by alpha blending or other fusion techniques, as would be understood by a person skilled in the art.

Yet another example of an image mode is contrast enhancing fusion, wherein IR image data values additional information from a VL image is aligned, high pass filtering the VL image to extract pixel data representing contours and/or edges in the visual image, combining luminance information of the extracted pixel data with luminance information of corresponding pixels in the IR image to augment the IR image with the contours and/or edges from the visual image, as would be understood by a person skilled in the art.

Yet another example of an image mode is distance map, wherein IR image data values additional information from a VL image is used to calculate the distance z from the thermal imaging device to the observed real world scene for each pixel and used to form a distance map. In one example, the distance z is dependent on a predetermined displacement between the visible light imaging system and the IR imaging system.

Yet another example of an image mode is blueprint, wherein additional information representing a blueprint or drawing of the observed real world scene is displayed as an IR image within a first graphical object displayed in a first set of non-overlapping graphical objects within said touch screen, as would be understood by a person skilled in the art.

Color Range

Applying a palette might in some embodiments comprise applying a first or a second palette only to IR image data values of an IR image that are within a particular range referred to as color range. The color range may be adapted by adapting a low threshold and/or a high threshold, wherein the low threshold and the high threshold define the color range. The color range may be adapted by simultaneously increasing or decreasing the low threshold and the high threshold with the same value, thereby transposing the color range.

The color range may be adapted by increasing or decreasing the low threshold or the high threshold individually or simultaneously, thereby increasing or reducing the color range.

Detecting a User Indication as a Swipe Gesture

Generally, computer systems that include or comprise a touch screen may detect user indications made on the touch screen and generate data indicative of user input. A touch screen enables a user to interact by user indications with what is displayed, e.g. graphical objects displayed on the touch screen using various types of gestures, such as swipe, pinch close, pinch open, tap, double tap, long press, flick, rotate. A touch screen may be configured to operate on a selection of technology, such as resistive, Surface acoustic wave (SAW), capacitive, surface capacitive, projected capacitive, mutual capacitance, self-capacitance or any other touch screen technology, as understood by a skilled person.

An image, e.g. an IR image, may be displayed in a graphical object, such as a frame or image window, to a user of the computer system and a gesture might be detected and converted to data indicative of the detected gesture, as would be understood by a person skilled in the art.

A swipe gesture may be detected via said touch screen by receiving a user indication and generating a first data representing a first swipe gesture starting location and second data representing a first swipe gesture direction, wherein the first swipe gesture starting location corresponds to a first swipe gesture starting location coordinate within said first graphical object displayed within said touch screen. Alternatively, the first swipe gesture starting location may correspond to a first swipe gesture starting location coordinate within said touch screen. In one example, this might involve generating data corresponding to a swipe gesture starting location on the right hand part of the touch screen and a leftward swipe gesture direction.

System Embodiments

As described above a user might be operating a computer system to analyze a visualized IR image for analysis. To perform a successful analysis the user might apply various image processing operations.

FIG. 1 shows a schematic view of one or more embodiments of a computer system, e.g. in the form of a thermography arrangement, infrared IR camera, smartphone, tablet computer, laptop computer, desktop computer or a wrist-worn computer. Said computer system is configured for processing an infrared (IR) image based on a swipe gesture. The computer system further comprises a processor/processing unit 112 provided with specifically designed programming or program code portions adapted to control the processing unit 112 to perform the steps and functions of embodiments of the method described herein. The computer system further comprises at least one memory 115 configured to store data values or parameters received from the processor 112 or to retrieve and send data values or parameters to the processor 112. In one or more embodiments the computer system further comprises a display 117 configured to receive a signal from a processor 112 and to display the received signal as a displayed image, e.g. to a user of the computer system. In one or more embodiments the computer system 110 further comprises an input device 118 configured to receive input or indications from a user, e.g. a user to indicate a swipe gesture in an image. In one exemplary embodiment the display 117 is integrated with a user input device 118 and implemented as a touch screen configured to receive a signal from the processor 112 and to display the received signal as a displayed image, e.g. to a user of the computer system. The touch screen (e.g., display 117) is further configured to receive indications from a user and to generate data indicative of user input, thereby enabling the user to interact by user indications with what is displayed, e.g. graphical objects displayed on the touch screen using various types of gestures. The touch screen is further configured to send the generated data as a signal to said processor 112. In one or more embodiments computer system further comprises a communications interface 116 configured to send or receive data values or parameters to/from a processor 112 to/from external units via the communications interface 116.

In one or more embodiments, a computer system having a processor operatively coupled to a memory and a touch screen for processing an infrared (IR) image based on a swipe gesture, the system comprising:
  a memory;
  a touch screen; and
  a processor, wherein said processor is configured to:
    display an IR image within a first graphical object displayed in a first set of non-overlapping graphical objects within said touch screen by applying a first palette;
    receive a user indication of a swipe gesture via said touch screen, wherein receiving a user indication further comprises generating first data representing a first swipe gesture starting location and second data representing a first swipe gesture direction, the first swipe gesture starting location corresponding to a first swipe gesture starting location coordinate within said first graphical object, wherein said first graphical object is displayed in a first set of non-overlapping graphical objects on said touch screen;
    split said IR image into two parts based on said first data, wherein the two parts comprises a first part and a second part;
    select said first part or said second part based on said second data;
    image process said selected first part or second part based on said second data; and;
    display said image processed first part or displaying said image processed second part overlaid onto said displayed IR image within said touch screen.

One of the advantages of the inventions is that complexity and time for a user to find an appropriate imaging processing to apply to an IR image for display to a user for analysis may be reduced.

The IR image upon which the analysis is based may be obtained from a memory in the computer system.

In one or more embodiments, the processor is further arranged to retrieve an IR image or a multilayer image from memory 115 as a signal frame of IR image data values or multilayer image data values.

The IR image upon which the analysis is based might be obtained from an external thermal imaging device, such as an IR camera, communicatively coupled to the computer system.

In one or more embodiments, the processor is further arranged to receive an IR image or a multilayer image from a thermal imaging device as a signal frame of IR image data values or multilayer image data values.

The IR image upon which the analysis is based might be obtained from an external thermal imaging device, such as an IR camera, communicatively coupled to the computer system, wherein a video or sequential series of IR images is received at a predetermined frame rate.

In one or more embodiments, the processor is further arranged to receive a series of IR images or a multilayer images from a thermal imaging device as signal frames of IR image data values or multilayer image data values with a predefined frame rate.

The IR image upon which the analysis is based might be obtained from an external thermal imaging device, such as an IR camera, communicatively coupled to the computer system, wherein a video or sequential series of IR images is received at a predetermined frame rate. The series of IR images may be previously recorded in the thermal imaging device or captured live and sent to the computer system.

In one or more embodiments, said received IR image is recorded live in real-time or near real-time.

In one or more embodiments the processor/processing unit 112 may be a processor such as a general or specific purpose processor/processing unit for example a microprocessor, microcontroller or other control logic that comprises sections of code or code portions, stored on a computer readable storage medium, such as the memory 115, that are fixed to perform certain tasks but also other alterable sections of code, stored on a computer readable storage medium, that can be altered during use. Such alterable sections of code can comprise parameters that are to be used as input for the various tasks, such as the calibration of the computer system, adaptation of the sample rate or the filter for the spatial filtering of the images, or any other parameter related operations known to a person skilled in the art and applied without inventive skill.

In one or more embodiments, the processor/processing unit 112 is configurable using a hardware description language (HDL).

In one or more embodiments, the processor/processing unit 112 is a Field-programmable gate array (FPGA), i.e. an integrated circuit designed to be configured by the customer or designer after manufacturing and configurable using a hardware description language (HDL). For this purpose, embodiments of the invention comprise configuration data configured to control an FPGA to perform the steps and functions of the method embodiments described herein.

In one or more embodiments, said communications interface 116 may comprise a selection of a Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

In this document, the terms "computer program product" and "computer-readable storage medium" may be used generally to refer to media such as the memory 115 or the storage medium of processing unit 112 or an external storage medium. These and other forms of computer-readable storage media may be used to provide instructions to processing unit 112 for execution. Such instructions, generally referred to as "computer program code" (which may be grouped in the form of computer programs or other groupings), when executed, enable the computer system to perform features or functions of embodiments of the current technology. Further, as used herein, "logic" may include hardware, software, firmware, or a combination of thereof.

In one or more embodiments the memory 115 may comprise a selection of a hard RAM, disk drive, a floppy disk drive, a magnetic tape drive, an optical disk drive, a CD or DVD drive (R or RW), or other removable or fixed media drive.

The computer system may be configured to capture IR images and alternatively VL images.

Figure 2:
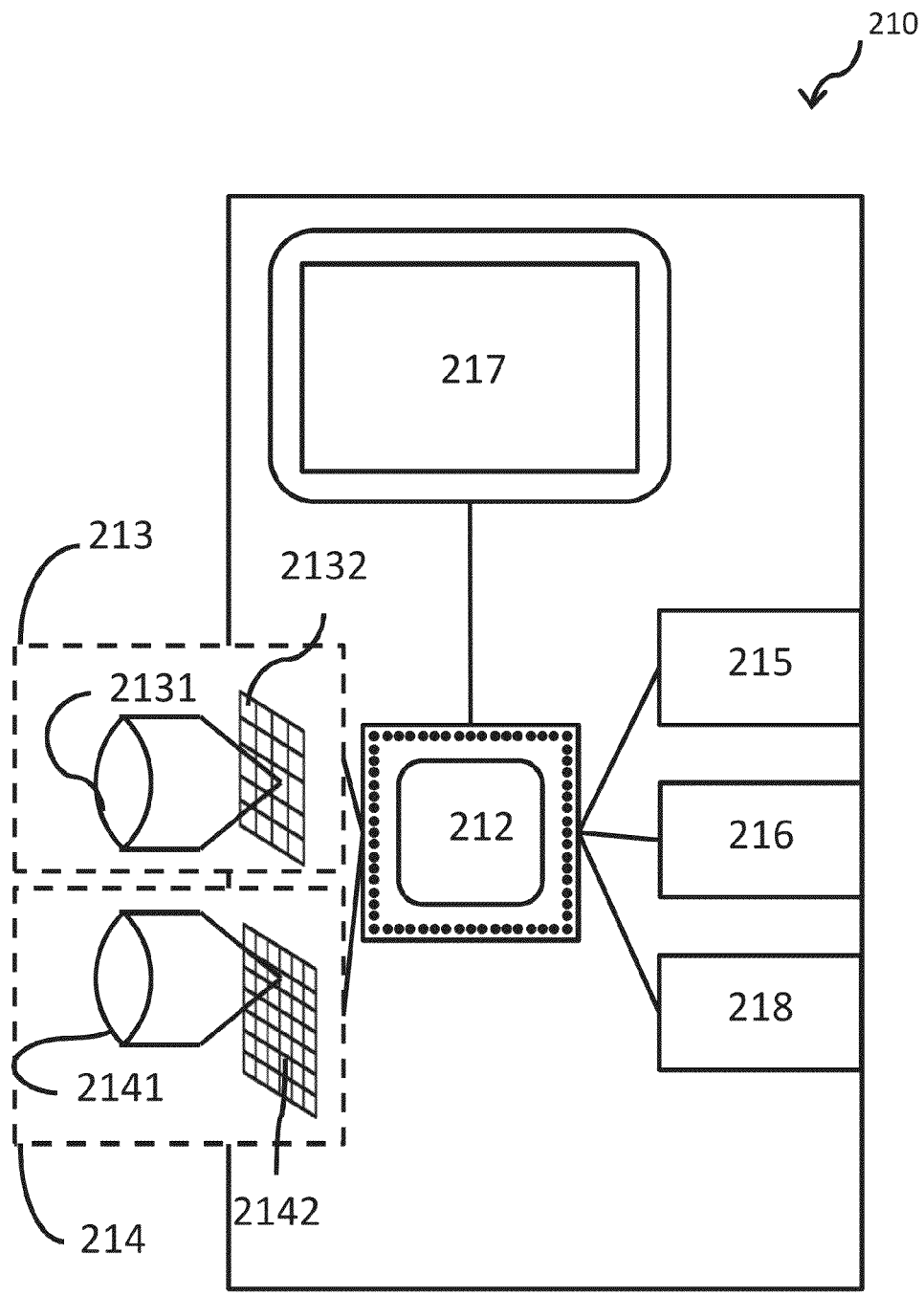
FIG. 2 shows a schematic view of the computer system in accordance with one or more alternative embodiments of the present disclosure.

FIG. 2 shows a schematic view of one or more embodiments of the computer system described in FIG. 1, e.g. in the form of a thermography arrangement, infrared IR camera, smartphone, tablet computer, laptop computer, desktop computer or a wrist-worn computer. Said computer system is configured for processing an infrared (IR) image based on a swipe gesture. The computer system further comprises a processor/processing unit 212 provided with specifically designed programming or program code portions adapted to control the processing unit 212 to perform the steps and functions of embodiments of the method described herein. The computer system further comprises at least one memory 215 configured to store data values or parameters received from the processor 212 or to retrieve and send data values or parameters to the processor 212. In one or more embodiments the computer system further comprises a display 217 configured to receive a signal from a processor 212 and to display the received signal as a displayed image, e.g. to a user of the computer system. In one or more embodiments the computer system further comprises an input device 218 configured to receive input or indications from a user, e.g. a user to indicate a swipe gesture in an image. In one exemplary embodiment the display 217 is integrated with a user input device 218 and implemented as a touch screen configured to receive a signal from the processor 112 and to display the received signal as a displayed image, e.g. to a user of the computer system. The touch screen (e.g., display 217) is further configured to receive indications from a user and to generate data indicative of user input, thereby enabling the user to interact by user indications with what is displayed, e.g. graphical objects displayed on the touch screen using various types of gestures. The touch screen (e.g., display 217) is further configured to send the generated data as a signal to said processor 112. In one or more embodiments computer system further comprises a communications interface 116 configured to send or receive data values or parameters to/from a processor 112 to/from external units via the communications interface 116.

wherein the computer system is further configured to capture infrared (IR) image data values, representing infrared radiation emitted from an observed real world scene by an infrared (IR) imaging system 213. Said IR imaging system comprises an infrared (IR) optical system 2131, e.g. comprising a lens, zoom functionality and focus functionality, together with a corresponding infrared IR detector 2132, for example comprising a micro-bolometer focal plane array, arranged to provide an IR image in the form of a signal frame of IR image data values, representing infrared radiation emitted from an observed real world scene. The infrared (IR) imaging system 213 is further arranged to send the signal frame of IR image data values to a processor 212.

An exemplary embodiment of the operation of such a computer system, such as an IR camera, is generally as follows: Infrared energy is accepted via said infrared optical system 2131 and directed onto the IR detector elements 2132. Each detector element responds to the infrared radiation or heat energy received. A frame of infrared (IR) image data values may, for example, be captured by scanning all the rows and columns of the detector and, in some embodiments, analog to digital converted to obtain a captured IR image wherein data values associated to each detector element is referred to as an IR image pixel having an associated row and column index.

In one or more embodiments, the computer system further comprises a visible light (VL) imaging system 214 that is configured to capture visible light (VL) image data values, representing VL emitted from an observed real world scene. Said VL imaging system employ an visible light (VL) optical system 2141, e.g. comprising a lens, zoom functionality and focus functionality together with a corresponding infrared VL detector 2142, for example comprising a digital charge-coupled device (CCD) or complementary metal-oxide-semiconductor (CMOS) active pixel sensors, to provide an VL image in the form of a signal frame of VL image data values, representing VL emitted from an observed real world scene. The VL imaging system 214 is further arranged to send the signal frame of VL image data values to a processor 212.

In one or more embodiments, the VL imaging system 214 may be adapted to capture electromagnetic radiation in other non-thermal wavelengths in addition to or in place of visible light wavelengths. For example, the VL imaging system 214 may be configured to capture near-infrared (NIR) light, short wave infrared (SWIR) light, ultra-violet (UV) light, or other non-thermal light in addition to or in place of visible light. For such embodiments, the VL imaging system 214 may represent a non-thermal imaging system comprising a non-thermal optical system (represented by the VL optical system 2141) and a non-thermal detector (represented by the VL detector 2142) responsive to non-thermal radiation. For example, electron multiplying CCD (EMCCD) sensors, scientific CMOS (sCMOS) sensors, intensified charge-coupled device (ICCD) sensors, as well as CCD-based and CMOS-based sensors discussed above and/or other suitable sensors, may be used to implement the non-thermal detector (represented by the VL detector 270) to detect NIR light, SWIR light, and/or other non-thermal light.

In one or more embodiments, the computer system is configured as two physically separate devices, i.e. a first device comprising a IR imaging system 213 and second device comprising a VL imaging system 214, communicatively coupled and depicting, or capturing, substantially the same observed real world scene. A memory 215 may be integrated into either one or the first or second device or a memory 215 may be integrated in a physically separate memory device, not shown in the figure, to which said first and second device is communicatively coupled.

In one or more embodiments, the computer system is configured to capture infrared (IR) image data values, representing infrared radiation emitted from an observed real world scene and then further to correct or calibrate captured data values by applying pre-determined IR temperature calibration data parameters, to map and scale the captured data values for display as an IR, or thermal, image, singly or combined with a VL image, according to methods known in the art.

In one or more embodiments, the IR imaging system 213 comprised in the computer system (e.g., a thermal imaging device) is further arranged to send the signal frame of IR image data values to a processor 212 intermediate storing in a memory comprised in or separate from the thermal imaging device 210.

In one or more embodiments, the IR imaging system 213 comprised in the computer system (e.g., a thermal imaging device) is further arranged to send the signal frame of IR image data values to an external processor/processing unit (not shown in FIG. 2) from said intermediate storing via a communications interface 216 (e.g., implemented in a same or similar manner as communications interface 116).

In one or more embodiments, the processor/processing unit 212 comprised in the computer system (e.g., a thermal imaging device) is further arranged to send the received IR image as a signal frame of IR image data values to a an external processor/processing unit (not shown in FIG. 2) directly or from said intermediate storing via said communications interface 216.

In one or more embodiments, a computer system includes a processor operatively coupled to a memory and a touch screen for processing an infrared (IR) image based on a swipe gesture, the system comprising:
  a memory;
  a touch screen;
  infrared (IR) imaging system; and
  a processor, wherein said processor is configured to:
  display an IR image within a first graphical object displayed in a first set of non-overlapping graphical objects within said touch screen by applying a first palette;
  receive a user indication of a swipe gesture via said touch screen, wherein receiving a user indication further comprises generating first data representing a first swipe gesture starting location and second data representing a first swipe gesture direction, the first swipe gesture starting location corresponding to a first swipe gesture starting location coordinate within said first graphical object, wherein said first graphical object is displayed in a first set of non-overlapping graphical objects on said touch screen;
  split said IR image into two parts based on said first data, wherein the two parts comprises a first part and a second part;
  select said first part or said second part based on said second data;
  image process said selected first part or second part based on said second data; and;
  display said image processed first part or displaying said image processed second part overlaid onto said displayed IR image within said touch screen.

In one or more embodiments, said computer system further comprises a visible light (VL) imaging system.

In one non-limiting example, an IR imaging system and alternatively a VL imaging system may by integrated in the computer system, thereby enabling capture of IR images and/or VL images.

Method Embodiments

When applying image processing based on swipe gestures, a first part of the IR image may be displayed with a first palette or first image mode applied and a second part of the IR image may be displayed with a second palette or second image mode applied, thereby enabling the user to compare the interpretability of both parts of the IR image.

Image Processing Based on a Swipe Gesture

Figure 3A:
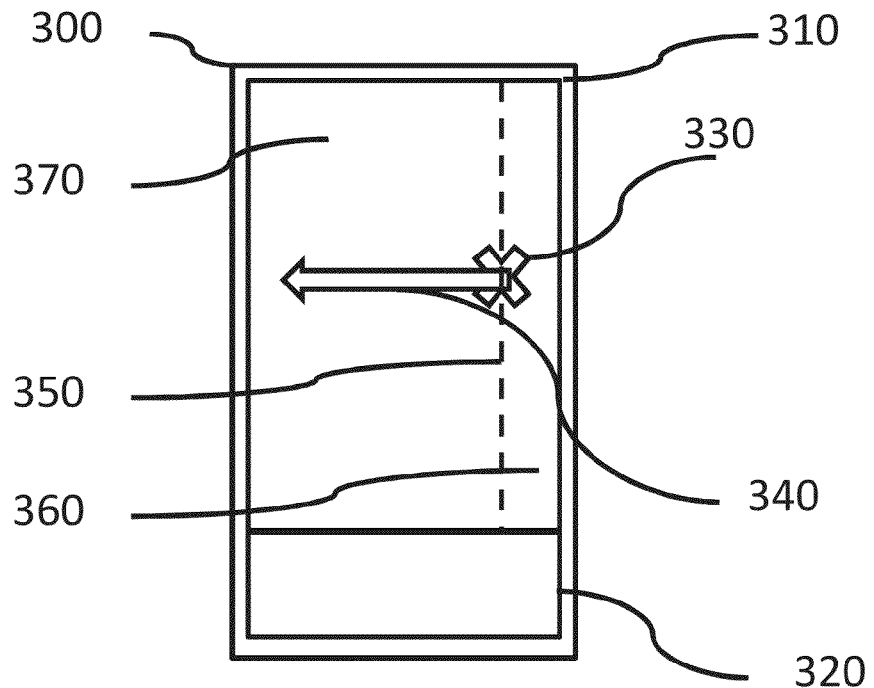
FIG. 3a illustrates how an IR image is processed based on a swipe gesture, according to an embodiment of a computer-implemented method of the present disclosure.

FIG. 3a illustrates how an IR image is processed based on a swipe gesture according to an embodiment of a computer-implemented method in a computer system having a processor operatively coupled to a memory and a touch screen 300 for processing an infrared (IR) image based on a swipe gesture. The method comprises displaying an IR image within a first graphical object 310 displayed in a first set of non-overlapping graphical objects within said touch screen 300 by applying a first palette, wherein the method further comprises receiving a user indication of a swipe gesture via said touch screen 300. Said receiving the user indication further comprises generating first data representing a first swipe gesture starting location 330 and second data representing a first swipe gesture direction 340, the first swipe gesture starting location corresponding to a first swipe gesture starting location coordinate within said first graphical object 310, wherein said first graphical object 310 is displayed in a first set of non-overlapping graphical objects within said touch screen 300. In one or more embodiments, the method further comprises displaying menu objects in a menu window, such as icons, slide controls and menus within a second graphical object 320. In one non limiting example these menu objects, when indicated by a user, adapts parameters controlling display options of the IR image and/or other options of the computer system. Examples of such display options may include setting of color span or selection of palette. Examples of other options of the computer system may include setting image capturing mode to single image or multiple image/video, activation of a spot indicator, activation of an illuminator/light or setting of image mode, such as IR, VL or combined contrast enhanced image.

The method further comprises splitting said IR image into two parts based on said first data, wherein the two parts comprise a first part 370 and a second part 360. In one or more embodiments, splitting said IR image into two parts comprises splitting the IR image along a vertical line 350 intersecting said first swipe gesture starting location 330. In one or more embodiments, splitting said IR image into two parts comprises splitting the IR image along a horizontal line intersecting said first swipe gesture starting location 330 (not shown in the figure). The method further comprises selecting said first part 370 or said second part 360 based on said second data. The method further comprises image processing said selected first part 370 or second part 360 based on said second data. The method further comprises displaying said image processed first part or displaying said image processed second part overlaid onto said displayed IR image within said touch screen. In one or more embodiments, splitting said IR image into two parts comprises splitting the IR image along a vertical line 350 intersecting a horizontally offset location of said first swipe gesture starting location 330. In one or more embodiments, splitting said IR image into two parts comprises splitting the IR image along a horizontal line intersecting a vertically offset location of said first swipe gesture starting location 330 (not shown in the figure). The first part or the second part may be a single line of the IR image or even null, for example, if said first swipe gesture starting location 330, the vertically offset location, or the horizontally offset location coincides with an edge of the IR image.

In one non-limiting example, the horizontally offset location is the right hand side edge of the first graphical object or the left hand side edge of the first graphical object, such that the entire displayed IR image is comprised in the first or second part. That is, overlaying an image processed part on the IR image only becomes visible when the swipe gesture current location is different from said first swipe gesture starting location.

A particular image processing operation might be applied when the user performs a rightward swipe gesture or a leftward swipe gesture, e.g. applying a second palette.

In one or more embodiments, said splitting said IR image into two parts comprises splitting the first parts as a left hand part and splitting the second part as a right hand part, wherein selecting said first part or said second part comprises determining the direction of the swipe gesture as a selection of a rightward swipe gesture or a leftward swipe gesture based on said second data and selecting the first part if a rightward swipe gesture is determined or selecting the second part if a leftward swipe gesture is determined.

In one or more embodiments, said image processing said selected first part or said selected second part based on said second data comprises applying a second palette to said selected first part or said selected second part. A particular image processing operation might be applied when the user performs an upward swipe gesture or a downward swipe gesture, e.g. applying a second image mode.

In one or more embodiments, said splitting said IR image into two parts comprises splitting the first parts as a top part and splitting the second part as a bottom part, wherein selecting said first part or said second part comprises determining the direction of the swipe gesture as a selection of an upward swipe gesture or a downward swipe gesture based on said second data and selecting the first part if a downward swipe gesture is determined or selecting the second part if a upward swipe gesture is determined.

In one or more embodiments, said image processing said selected first part or said selected second part based on said second data comprises applying a second image mode to said selected first part or said selected second part, wherein said image mode may be a selection of IR only, fusion, contrast enhancing fusion or VL only but not limited thereto.

The user may want to visualize only parts of an IR image or to apply image processing only to parts of an IR image, wherein IR image data values of an IR image is within a certain color range.

In one or more embodiments, wherein image processing said selected first part or said selected second part based on said second data comprises applying a second color range to said selected first part or said selected second part. This way only particular aspects may be studied, e.g. objects within a particular temperature range.

In some situations, the user might want to analyze various objects in the displayed IR image by repetitively alternating between different image processing of the IR image, e.g. by reversing the direction of the swipe movement repeatedly. By continuously splitting, processing and displaying the IR image into a first and a second part as long as the swipe gesture is not ended, the line along which the split is made is made "sticky" to the user's finger (e.g., to "drag" the vertical line splitting the IR image) as long as the swipe gesture is not ended.

Figure 3B:
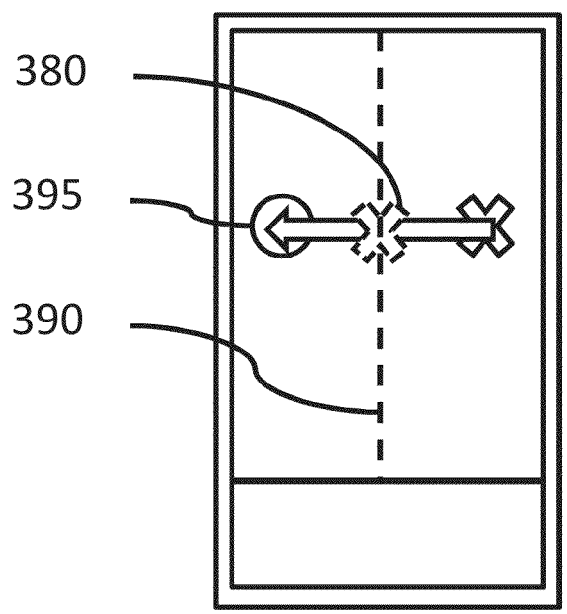
FIG. 3b illustrates how an IR image is processed based on a swipe gesture, according to another embodiment of a computer-implemented method of the present disclosure.

FIG. 3b illustrates how an IR image is processed based on a swipe gesture according to one or more embodiments of a computer-implemented method of the computer system described above in connection with FIG. 3a, wherein receiving a user indication of a swipe gesture via said touch screen further comprises periodically generating third data representing a swipe gesture current location 380, splitting said IR image into a first part and a second part based on said third data (e.g., along a vertical line 390), selecting said first part or said second part based on said second data, image processing said selected first part or second part based on said second data and displaying said image processed first part or displaying said image processed second part overlaid onto said displayed IR image within said touch screen 300 until it is detected that a fourth data representing a first swipe gesture ending location 395 is generated.

In one or more embodiments, the method further comprises displaying said IR image within a first graphical object displayed in a first set of non-overlapping graphical objects within said touch screen by applying said second palette.

One of the advantages of the invention is therefore that the user quickly may alternate between applied palettes or image modes of an object in the IR image and complete the swipe gesture when a final selection has been made.

Use Case Embodiments

Figure 4A:
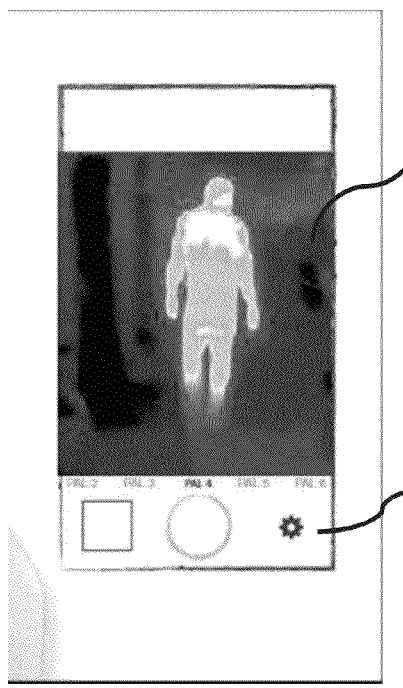
FIG. 4a shows an example image being displayed within a touch screen according to an embodiment of a computer-implemented method of the present disclosure.

FIG. 4a shows an example IR image displayed according to one or more embodiments of a computer-implemented method in a computer system. As shown, the IR image may be displayed within a first graphical object 410 (e.g., an image window or frame) which is displayed in a first set of non-overlapping graphical objects (e.g., the image window and a menu window 411) within said touch screen by applying a first palette.

Figure 4B:
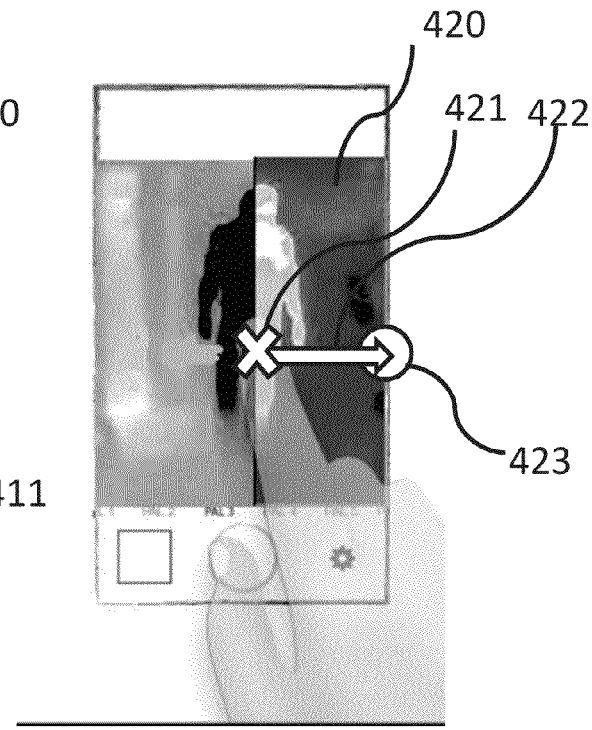
FIG. 4b shows another example image illustrating how an IR image is split within the touch screen according to an embodiment of a computer-implemented method of the present disclosure.

In one or more of the embodiments where the IR image is split into a first part and a second part, the first part may be split as a left hand part and the second part may be split as a right hand part as illustrated for example in FIG. 4b.

FIG. 4b shows another example IR image illustrating how an IR image may be split and processed according to one or more embodiments of the computer-implemented method in the computer system. The method may include receiving a user indication of a swipe gesture via said touch screen, wherein said receiving a user indication further comprises generating first data representing a first swipe gesture starting location 421 and second data representing a first swipe gesture direction 422. In one or more embodiments, the first swipe gesture starting location corresponds to a first swipe gesture starting location coordinate within said first graphical object 420, wherein said first graphical object is displayed in a first set of non-overlapping graphical objects on said touch screen. In one or more embodiments, the IR image is split into two parts based on said first data, wherein the two parts comprise a first part and a second part, wherein the first parts are split as a left hand part and the second part is split as a right hand part.

The first part is selected in response to a rightward swipe gesture, wherein the direction of the swipe gesture may be determined as one of a rightward swipe gesture or a leftward swipe gesture based on said second data.

The selected first part is image processed based on said second data, indicating a rightward swipe, and comprises applying a second palette to said selected first part. The image processed first part is displayed or presented overlaid onto said displayed IR image within the first graphical object within said touch screen.

The receiving of the user indication may further comprise periodically generating third data representing a swipe gesture current location until it is detected that a fourth data representing a first swipe gesture ending location 423 is generated, in this example when the swipe gesture reaches the end of the first graphical object 420 or the touch-sensitive area of the touch screen. Alternatively, a first swipe gesture ending location may be detected when the user ends his swipe gesture, e.g. by removing his finger.

Figure 4C:
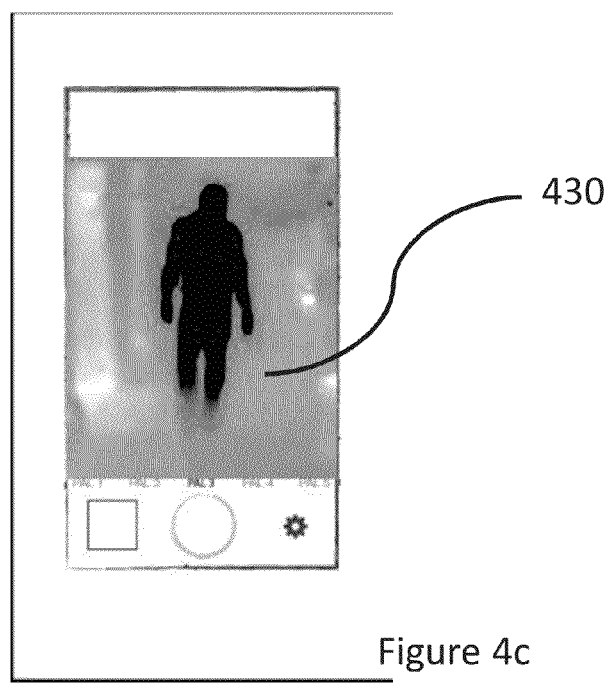
FIG. 4c shows another example image being displayed within the touch screen according to an embodiment of a computer-implemented method of the present disclosure.

For example, when the end of a first graphical object 430 or touch-sensitive area is detected as the first swipe gesture ending location 423, the processed IR image may be displayed with said second palette applied, within the first graphical object 430 displayed in a first set of non-overlapping graphical objects within said touch screen, as shown in FIG. 4c.

Figure 5A:
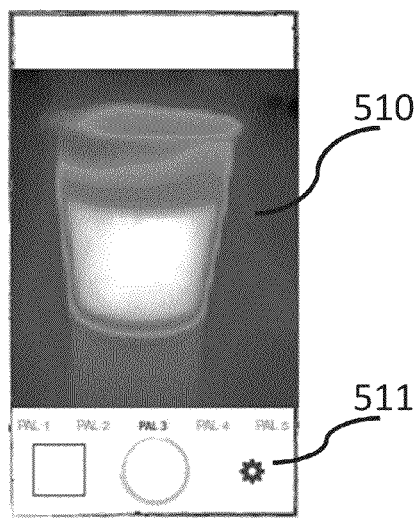
FIG. 5a shows an example image being displayed within a touch screen according to an embodiment of a computer-implemented method of the present disclosure.

FIG. 5a shows an example IR image displayed according to one or more embodiments of a computer-implemented method in a computer system. As shown, the IR image may be displayed within a first graphical object 510, such as an image window or frame, displayed in a first set of non-overlapping graphical objects, such as the image window and a menu window 511, within said touch screen by applying a first palette.

Figure 5B:
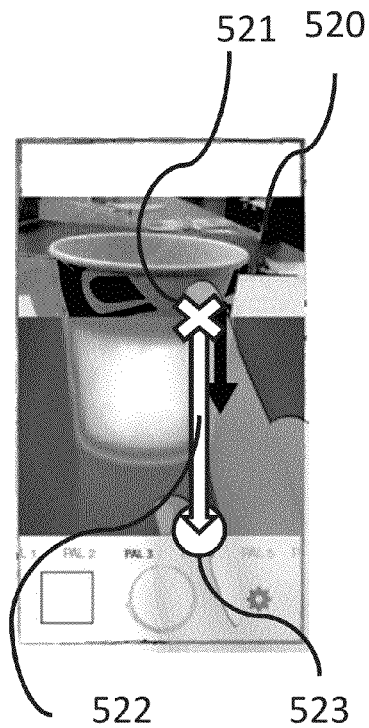
FIG. 5b shows another example image illustrating how an IR image is split within the touch screen according to an embodiment of a computer-implemented method of the present disclosure.

In one or more of the embodiments where the IR image is split into a first part and a second part, the first part may be split as a top part and the second part as a bottom part as illustrated for example in FIG. 5*b*.

FIG. 5*b* shows another example IR image illustrating how an IR image may be split and processed according to one or more embodiments of the computer-implemented method in the computer system. The method may include receiving a user indication of a swipe gesture via said touch screen, wherein said receiving the user indication further comprises generating first data representing a first swipe gesture starting location 521 and second data representing a first swipe gesture direction 522. In one or more embodiments, the first swipe gesture starting location 521 corresponds to a first swipe gesture starting location coordinate within said first graphical object 520, wherein said first graphical object is displayed in a first set of non-overlapping graphical objects on said touch screen. In one or more embodiments, the IR image is split into two parts based on said first data, wherein splitting said IR image into two parts comprises splitting the first parts as a top part and splitting the second part as a bottom part.

Selecting said first part or said second part further comprises determining the direction of the swipe gesture as a selection of an upward swipe gesture or a downward swipe gesture based on said second data, and selecting the first part as a downward swipe gesture is determined.

In one or more embodiments, said selected first part is image processed based on said second data by applying a second image mode to said selected first part or said selected second part, wherein said image mode may be a selection of IR only, fusion, contrast enhancing fusion or VL only but not limited thereto. The image processed first part is displayed or presented overlaid onto said displayed IR image within the first graphical object within said touch screen.

The receiving of the user indication of a swipe via said touch screen may further comprise periodically generating third data representing a swipe gesture current location until it is detected that a fourth data representing a first swipe gesture ending location 523 is generated, in this example when the swipe gesture reaches the end of the first graphical object 520 or the touch sensitive area of the touch screen. Alternatively, the first swipe gesture ending location may be detected when the user ends his swipe gesture, e.g. by removing his finger.

Figure 5C:
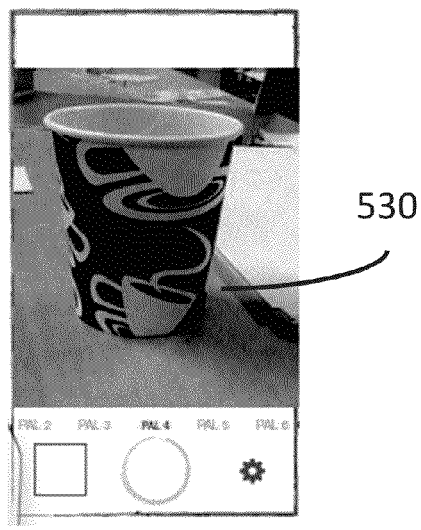
FIG. 5c shows another example image being displayed within the touch screen according to an embodiment of a computer-implemented method of the present disclosure.

For example, when the end of a first graphical object 530 or touch-sensitive area is detected as the first swipe gesture ending location 523, the processed IR image may be displayed with said second image mode applied, within the first graphical object displayed 530 in a first set of non-overlapping graphical objects within said touch screen, as shown in FIG. 5*c*.

In some embodiments image processing is triggered by a selection of a rightward swipe gesture, a leftward swipe, an upward swipe gesture or a downward swipe gesture based on said second data. Further, although in the examples of FIGS. 4*a*-5*c* a rightward swipe triggered image processing to apply a second palette where as a downward swipe triggered image processing to apply an image mode, it should be appreciated that any of the rightward, leftward, upward, or downward swipe may be assigned to trigger any desired image processing according to desired applications of the embodiments.

Figure 6:
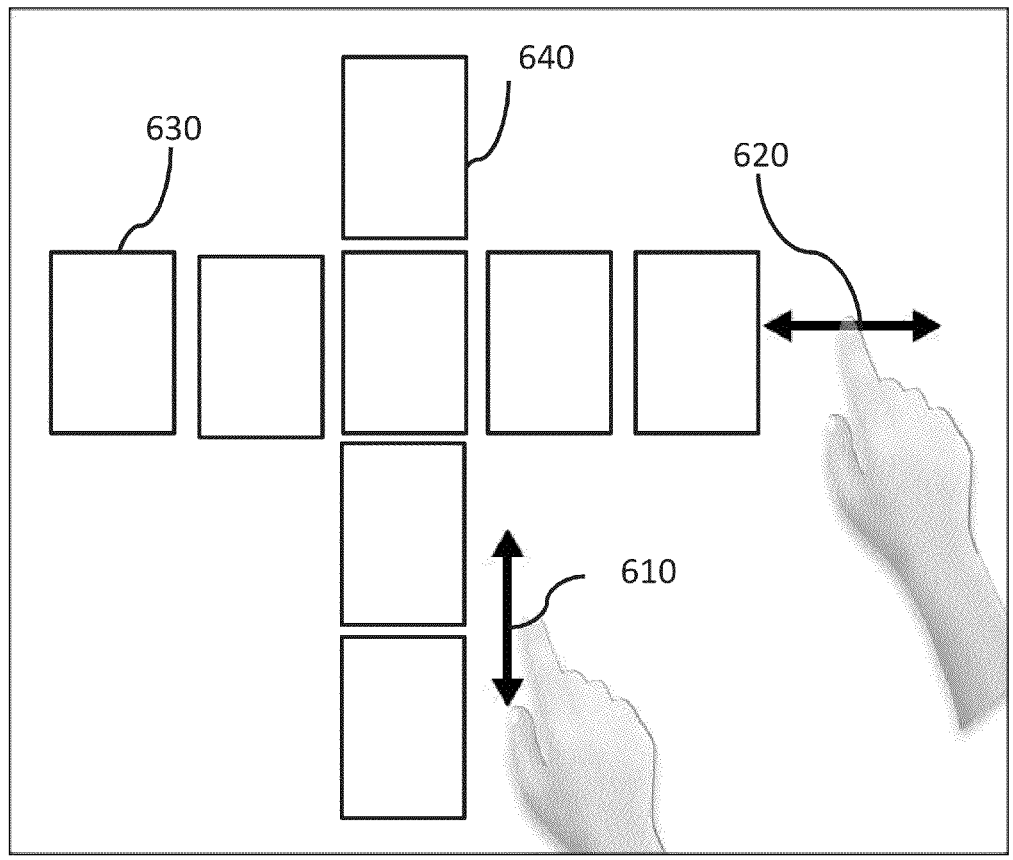
FIG. 6 illustrates how an image processing operation may be selected based on a determination of a direction of a swipe gesture, according to an embodiment of a computer-implemented method of the present disclosure.

FIG. 6 illustrates how an image processing operation may be selected based on a determination of a direction of a swipe gesture according to one or more embodiments of the computer-implemented method in the computer system described above. In one or more embodiments, said selecting of said first part or said second part comprises determining the direction of the swipe gesture as a selection of a rightward swipe gesture, a leftward swipe, an upward swipe gesture or a downward swipe gesture based on said second data. In one non-limiting example, an upward or downward swipe gesture 610 would trigger a first type of image processing, e.g. applying a second image mode, and a leftward or rightward swipe gesture 620 would trigger a second type of image processing, e.g. applying a second palette. In this way, a user may quickly find a palette 630 that enables an improved visualization and interpretability of an IR image and further quickly find an image mode 640 that enables an improved visualization and interpretability of an IR image.

In some embodiments image processing to resize the IR image is triggered by stationary swipe gesture or tap gesture.

Figure 7A:
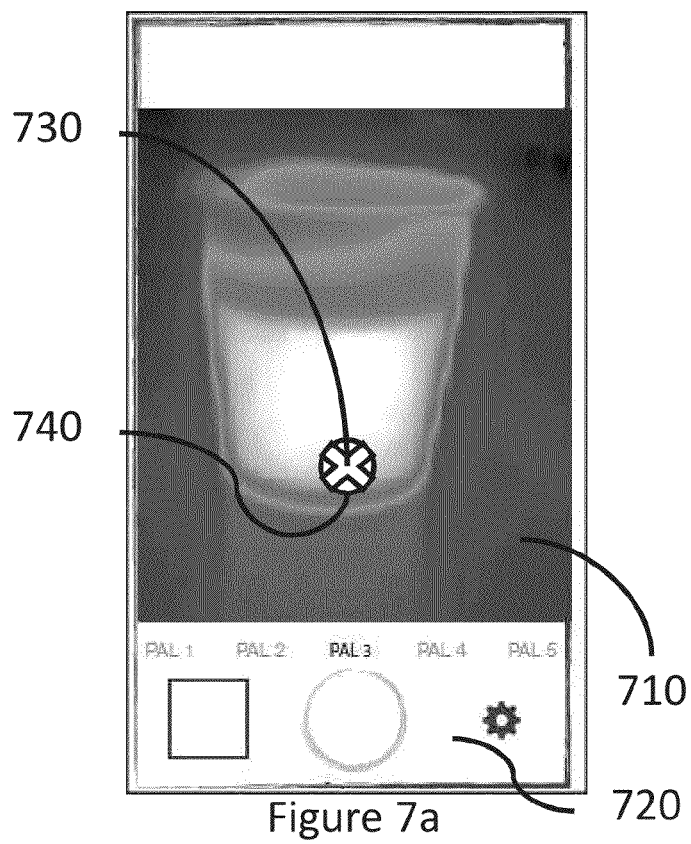
FIG. 7a shows an example image illustrating how an IR image is processed based on a swipe gesture including a stationary swipe or tap gesture, according to an embodiment of a computer-implemented method of the present disclosure.

FIG. 7*a* shows an example IR image illustrating how an IR image may be processed based on a swipe gesture including a stationary swipe or tap gesture, according to one or more embodiments of a computer-implemented method in a computer system including a processor operatively coupled to a memory and a touch screen. In one or more embodiments, the method may comprise:

displaying an IR image within a first graphical object 710 displayed in a first set of non-overlapping graphical objects within said touch screen by applying a first palette;

receiving a user indication of a swipe gesture via said touch screen, wherein said receiving the user indication further comprises generating first data representing a first swipe gesture starting location and second data representing a first swipe gesture direction, the first swipe gesture starting location corresponding to a first swipe gesture starting location coordinate within said first graphical object, wherein said first graphical object 710 is displayed in a first set of non-overlapping graphical objects on said touch screen;

splitting said IR image into two parts based on said first data, wherein the two parts comprise a first part and a second part;

selecting said first part or said second part based on said second data;

image processing said selected first part or second part based on said second data; and displaying said image processed first part or displaying said image processed second part overlaid onto said displayed IR image within said touch screen.

Figure 7B:
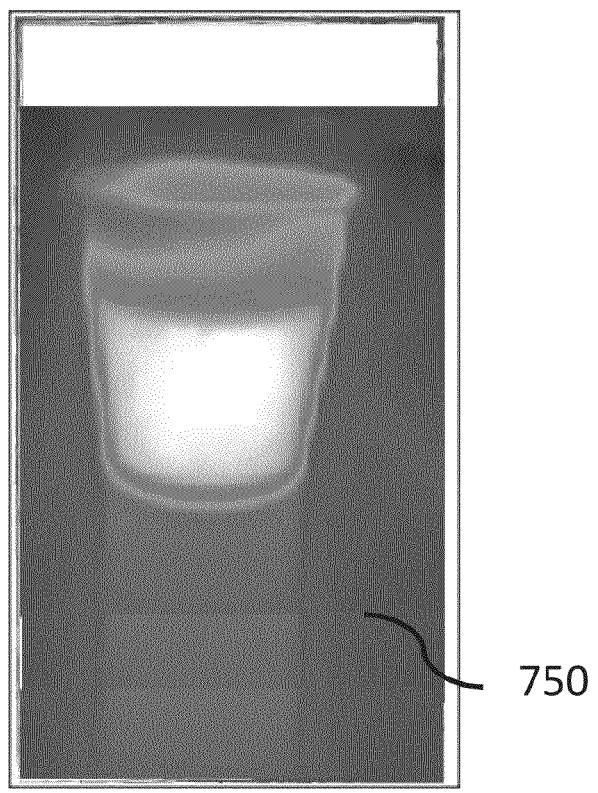
FIG. 7b shows an example image that is resized based a swipe gesture, according to an embodiment of a computer-implemented method of the present disclosure.

In one or more embodiments, said first part comprises the entire displayed IR image 750 as shown in FIG. 7*b*, wherein:

said selecting said first part or said second part further comprises determining the direction of the swipe gesture as a stationary swipe gesture or tap gesture based on said second data;

said image processing said selected first part comprises resizing said displayed IR image; and;

said displaying said image processed first part comprises displaying said image processed first part within the total area included by said first graphical object 710 and a second graphical object 720.

In one or more embodiments, wherein said resizing said displayed IR image 750 is performed proportionally to a quota based on the area included by said first graphical object 710 and the total area included by said first graphical object 710 and a second graphical object 720.

The resizing may be performed by image interpolation techniques, as would be understood by a person skilled in the art.

In one non-limiting example, a user may make a stationary swipe gesture also referred to as a tap gesture, defined by determining that the first data representing a first swipe gesture starting location 730 is equal or substantially equal (e.g., when differences fall within a specified small margin) to the fourth data representing a first swipe gesture ending location 740. The displayed IR image 750 is then resized and displayed on an area of the touch screen including a first graphical object 710 and a second graphical object 720, e.g. displaying the IR image in full screen over the previously dedicated to a second graphical menu object.

Figure 8:
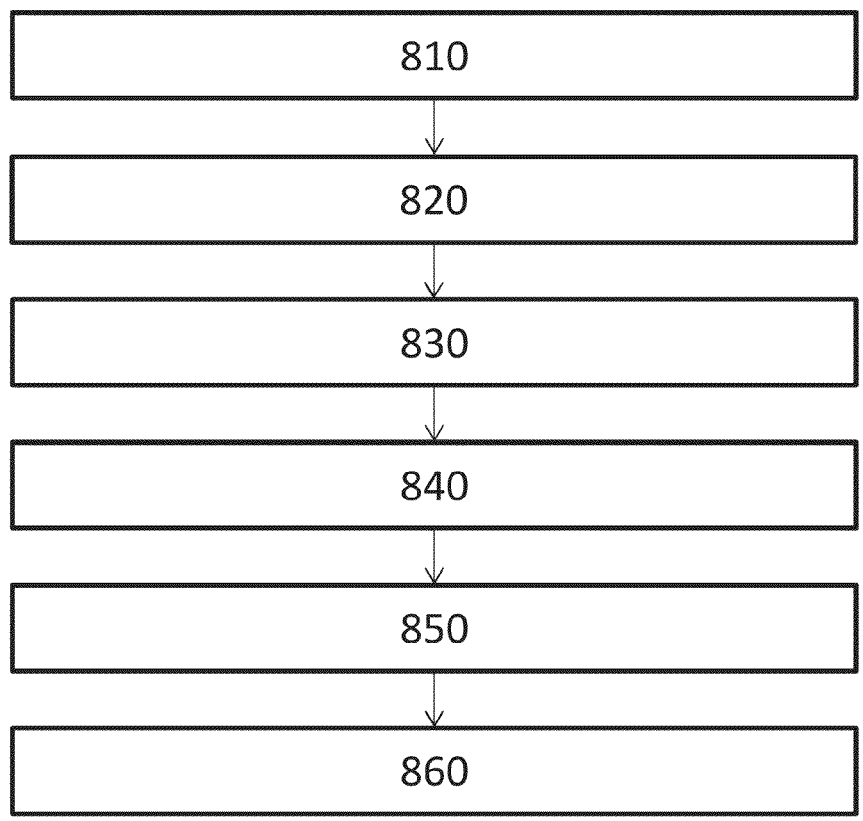
FIG. 8 shows a flowchart of a computer-implemented method to process an IR image based on a swipe gesture, in accordance with an embodiment of the present disclosure.

FIG. 8 shows a flowchart of one or more embodiments of a computer-implemented method in a computer system having a processor operatively coupled to a memory and a touch screen for processing an infrared (IR) image based on a swipe gesture. In one or more embodiments, the method comprises:

At block 810: displaying an IR image within a first graphical object displayed in a first set of non-overlapping graphical objects within said touch screen by applying a first palette;

At block 820: receiving a user indication of a swipe gesture via said touch screen, wherein receiving a user indication further comprises generating first data representing a first swipe gesture starting location and second data representing a first swipe gesture direction, the first swipe gesture starting location corresponding to a first swipe gesture starting location coordinate within said first graphical object, wherein said first graphical object is displayed in a first set of non-overlapping graphical objects on said touch screen;

At block 830: splitting said IR image into two parts based on said first data, wherein the two parts comprises a first part and a second part;

At block 840: selecting said first part or said second part based on said second data;

At block 850: image processing said selected first part or second part based on said second data; and;

At block 860: displaying said image processed first part or displaying said image processed second part overlaid onto said displayed IR image within said touch screen.

Further Embodiments

Adjusting Temperature Ranges.

In general, processing, presenting, analyzing, and monitoring of an IR image of an observed real world scene are often dependent on color ranges, temperature spans, temperature ranges, or other parameters that affect how the IR image may be visually represented. It may therefore be beneficial to reduce complexity and time for a user to find appropriate color ranges, temperature spans, or other image processing/displaying parameters to apply to an IR image, in particular in a computer system configured with a touch screen with a touch-based user input functionality By conveniently discovering suitable image processing/display parameters for IR images depicting particular scenes, users of a computer system (e.g., an IR camera system or other computer system configured for thermographic use) may be able to quickly obtain a presentation of the IR images having improved interpretability and/or showing particular aspects or details that may be analyzed.

Figure 9:
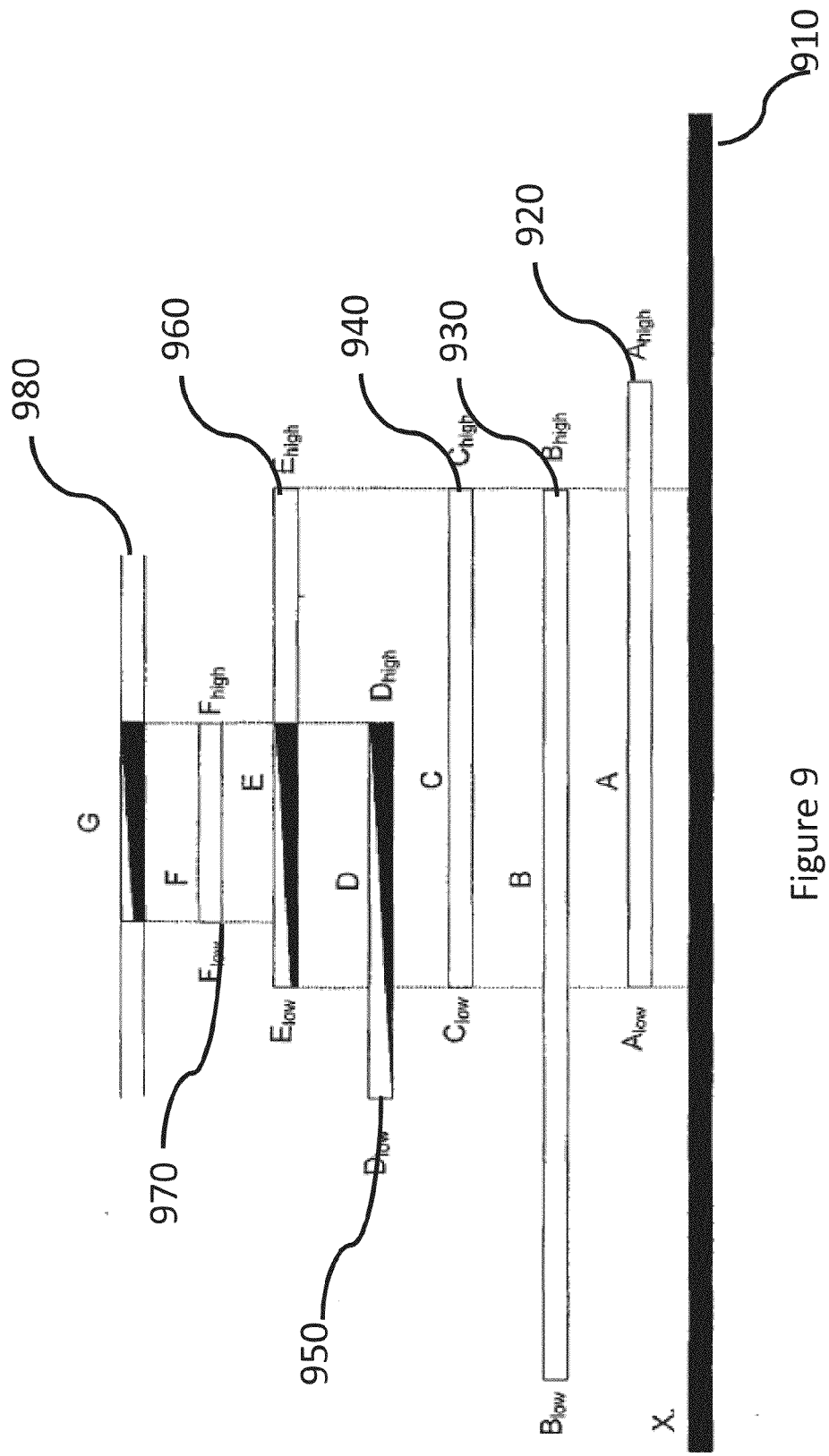
FIG. 9 shows various example parameters for processing or presenting IR images in a thermal imaging device display, in accordance with an embodiment of the disclosure.

FIG. 9 shows various example parameters (e.g., temperature spans) that may define IR images or be used for image processing or presenting IR images in a thermal imaging device display (e.g., display 117 or 217), in accordance with an embodiment of the disclosure. In FIG. 9, various bars 910-980 may represent different temperature ranges that are inherent in the scene or the IR camera, or levels/spans of different view parameter settings which can be set by the user of the IR camera. The numerous temperature ranges represented in the example of FIG. 9 also serve to illustrate problems associated with presenting IR images on a display to a user, such as for example a difficulty in interpreting IR images due to complex relationships between the temperature ranges which may be hidden from the user.

In FIG. 9, the following temperature ranges are shown, and the notations introduced below may be adhered to hereinafter:

Temperature range X (represented by bar 910) illustrates a possible scene thermal content of the imaged scene. This may substantially be any temperature range a scene may have.

Temperature range A (represented by bar 920) illustrates an actual scene thermal content of the imaged scene, e.g., a span between the actual minimum temperature in the imaged scene $A_{low}$ and the actual maximum temperature in the imaged scene $A_{high}$.

Temperature range B (represented by bar 930) illustrates the dynamic range of the IR camera. $B_{low}$ denotes the lowest detectable temperature, and $B_{high}$ denotes the highest detectable temperature, i.e., the dynamic range of the imaging system of the IR camera.

Temperature range C (represented by bar 940) illustrates the image range of image data values in a captured IR image, e.g. a span between the minimum image data value $C_{low}$ and the maximum image data value $C_{high}$ in a captured IR image. $C_{low}$ denotes the lowest temperature, and $C_{high}$ denotes the highest temperature in the captured thermal image content of the IR camera. The actual thermal image content C captured in the IR image may be limited by the temperature range B of the thermal imaging device.

Temperature range D (represented by bar 950) illustrates the choice of which temperature span to colorize (e.g., to map temperature values to colors). This is also referred to herein as a color range or color span, i.e., a mapping to a palette comprising colors. $D_{low}$ denotes the lowest temperature, and $D_{high}$ denotes the highest temperature that is to be colorized by the IR camera.

Temperature range E (represented by bar 960) illustrates the captured image's calculated colors to use in the thermal image. $E_{low}$ denotes the lowest temperature to be colored in the captured image, and $E_{high}$ denotes the highest temperature that is colored in the captured image. However, in the example of FIG. 9, since $D_{high}$ has been set lower than $C_{high}$, the part of E located between $D_{high}$ and $C_{high}$ are saturated, and therefore is colored the same color as the end of the temperature span D, or a particular color used to display saturated parts of a thermal image.

Temperature range F (represented by bar 970) illustrates the thermal image fusion span where thermal image information and visual image information is combined. $Fl_{ow}$ denotes the lower thermal image fusion level/threshold, and $F_{high}$ denotes the higher thermal image fusion level/threshold. For the infrared image data values within F the thermal imaging device will display IR image data values, and for the infrared image data values outside F the thermal imaging device will display visual light (VL) image data values. Temperature range G (represented by bar 980) illustrates the resulting fusion image presented by the IR camera.

Temperature ranges A-F may thus respectively comprise a minimum temperature value, a maximum temperature value, and temperature values in between the minimum and the maximum. In general, temperature ranges D-F may be represented by their respective minimum temperature values (also referred to as minimum color levels), maximum temperature values (also referred to as maximum color levels), and optionally one or more temperature values in between the minimum and the maximum. In one non-limiting example, temperature ranges D-F may respectively be represented using a corresponding minimum temperature value, maximum temperature value, and middle temperature value. According to one or more embodiments of the disclosure, one or more of temperature ranges A-F may be visually presented (e.g., on a display) to a user, for example as a separate graphical object such as a legend or scale displayed together with an IR image presented according to the temperature ranges.

As discussed above, it may be beneficial to provide a computer system (e.g., an IR camera or a thermographic arrangement) that permits users to quickly and conveniently discover and apply desired temperature ranges for processing and/or presenting IR images. Various techniques to provide such a computer system by processing swipe gestures are discussed below with reference to FIGS. 10a-14, in accordance with various embodiments of the disclosure.

FIG. 10a and FIG. 10b show example images of an IR image and an associated temperature range that may be displayed within a touch screen, in accordance with an embodiment of the disclosure. In the example images of FIGS. 10a and 10b, an IR image and an associated temperature range are displayed within graphical objects 1010 and 1016, respectively, on a touch screen. Other graphical objects may be displayed if desired. As one example, FIGS. 10a and 10b show a graphical object 1020, which may for example be a menu window as shown in FIG. 10b.

Graphical objects 1010, 1016, 1020 may be structured, grouped, managed, and/or arranged for display according to appropriate graphical user interface (GUI) techniques. For example, graphical objects 1010 and 1020 may be managed in a first set of non-overlapping graphical objects, whereas graphical object 1016 may be managed in a second set of graphical objects that may overlap with objects in the first set of graphical objects.

According to various embodiments, one or more portions of graphical object 1016 may each be associated with a corresponding temperature value from the temperature range represented in graphical object 1016. In one example, graphical object 1016 may comprise a first portion 1015 associated with a minimum temperature value, a second portion 1017 associated with a middle temperature value, and a third portion 1018 associated with a maximum temperature value of the temperature range represented in graphical object 1016. In other examples, graphical object 1016 may comprise fewer than the three portions identified in the previous example. That is, for example, there may be just one portion associated with a temperature value (e.g., a portion associated with a middle temperature value), or there may just two portions (e.g., two portions each associated with a maximum and a minimum temperature value). In yet other examples, graphical object 1016 may comprise additional portions that correspond to additional temperature values from the temperature range.

According to various embodiments, a user that wishes to adjust one of the temperature ranges D-F described in connection with FIG. 9, for example, may apply a gesture motion on graphical object 1016 representing one of the temperature ranges D-F to do so. For example, via an appropriate gesture motion on graphical object 1016, a user may modify only the minimum value or only the maximum value, or simultaneously modify any combination of the minimum temperature value, the maximum temperature value, and the middle temperature value of the temperature range. In one non-limiting example, this may involve starting a swipe gesture on the first portion 1015, the third portion 1018, or the second portion 1017 of graphical object 1016.

FIG. 11a is an example touch screen image illustrating how a swipe gesture from a user may be received to modify a temperature range, in accordance with an embodiment of the present disclosure. The example of FIG. 11a shows a downward swipe gesture starting on a location corresponding to first portion 1015 of graphical object 1016, where first portion 1015 may be associated with a minimum temperature value of a temperature range represented in graphical object 1016.

FIG. 11b illustrates an example of how the temperature range is modified as a result of receiving the user indication of a downward swipe shown in FIG. 11a, in accordance with an embodiment of the disclosure. In various embodiments, a first data representing a swipe gesture starting location (illustrated in the figures using a cross mark) and a second data representing a swipe gesture direction (illustrated in the figures using an arrow) may be generated in response to receiving the example user indication of FIG. 11a, where the swipe gesture starting location corresponds to first portion 1015 of graphical object 1016 and the swipe gesture direction corresponds to a downward direction. Responsive to such data representing the example swipe gesture of FIG. 11a, the temperature range represented in graphical object 1016 may be adjusted, updated, or otherwise modified by lowering its minimum temperature value, according to some embodiments.

As may be understood by comparing FIG. 11a with FIG. 11b, in this example the minimum temperature value (indicated numerically in general proximity to first portion 1015 in this example) is lowered in response to the downward swipe gesture that started from a location associated the minimum temperature value. This in turn lowers a middle temperature value (indicated numerically in general proximity to second portion 1017 of graphical object 1016 in this example), while the maximum temperature value (indicated numerically in general proximity to third portion 1018 of graphical object 1016 in this example) is unaltered, according to embodiments illustrated by this example. According to various embodiments, the minimum temperature value may be raised, instead of being lowered, if the swipe gesture direction is an upward direction instead of the downward direction as given in this example. It should be noted that graphical object 1016 is shown to include a scale with numerical indications of temperature values (e.g., corresponding to maximum, middle, and minimum temperature values) only as an example, and that graphical object 1016 may alternatively or additionally include any other suitable graphical representation of a desired temperature range, and may or may not include numerical indications, depending on particular applications of the disclosure.

FIG. 12a illustrates another example of how a swipe gesture from a user may be received to modify a temperature range, and FIG. 12b illustrates an example of how the temperature range is modified as a result of receiving the example swipe gesture of FIG. 12a, in accordance with an embodiment of the present disclosure. The example of FIG. 12a shows a downward swipe gesture starting on a location corresponding to third portion 1018 of graphical object 1016, where third portion 1018 may be associated with a maximum temperature value of a temperature range represented in graphical object 1016.

As illustrated by the examples of FIGS. 12a and 12b, the temperature range represented in graphical object 1016 may be adjusted, updated, or otherwise modified by lowering its maximum temperature value (indicated numerically in general proximity to third portion 1018 of graphical object 1016), in response to receiving the downward swipe gesture that started from a location associated with the maximum temperature value, in accordance with some embodiments of the disclosure. This in turn lowers a middle temperature value (indicated numerically in general proximity to second portion 1017 of graphical object 1016), while the minimum temperature value (indicated numerically in general proximity to first portion 1015 of graphical object 1016) is unaltered, according to embodiments illustrated by this example. According to various embodiments, the maximum temperature value may be raised, instead of being lowered, if the swipe gesture direction is an upward direction instead of the downward direction as given in this example.

FIG. 13a illustrates yet another example of how a swipe gesture from a user may be received to modify a temperature range, and FIG. 13b illustrates an example of how the temperature range is modified as a result of receiving the example swipe gesture of FIG. 13a, in accordance with an embodiment of the present disclosure. The example of FIG. 13a shows a downward swipe gesture starting on a location corresponding to second portion 1017 of graphical object 1016, where second portion 1017 may be associated with a middle temperature value of a temperature range represented in graphical object 1016.

As illustrated by the examples of FIGS. 13a and 13b, the temperature range represented in graphical object 1016 may be adjusted, updated, or otherwise modified by lowering its middle temperature value (indicated numerically in general proximity to second portion 1017 of graphical object 1016), in response to receiving the downward swipe gesture that started from a location associated with the middle temperature value, in accordance with some embodiments of the disclosure. This in turn lowers the minimum and the maximum temperature values (indicated numerically in general proximity to first portion 1015 and third portion 1018, respectively, of graphical object 1016), according to embodiments illustrated by this example. According to various embodiments, the middle, the minimum, and the maximum temperature values may be raised, instead of being lowered, if the swipe gesture direction is an upward direction instead of the downward direction as given in this example.

Figure 14:
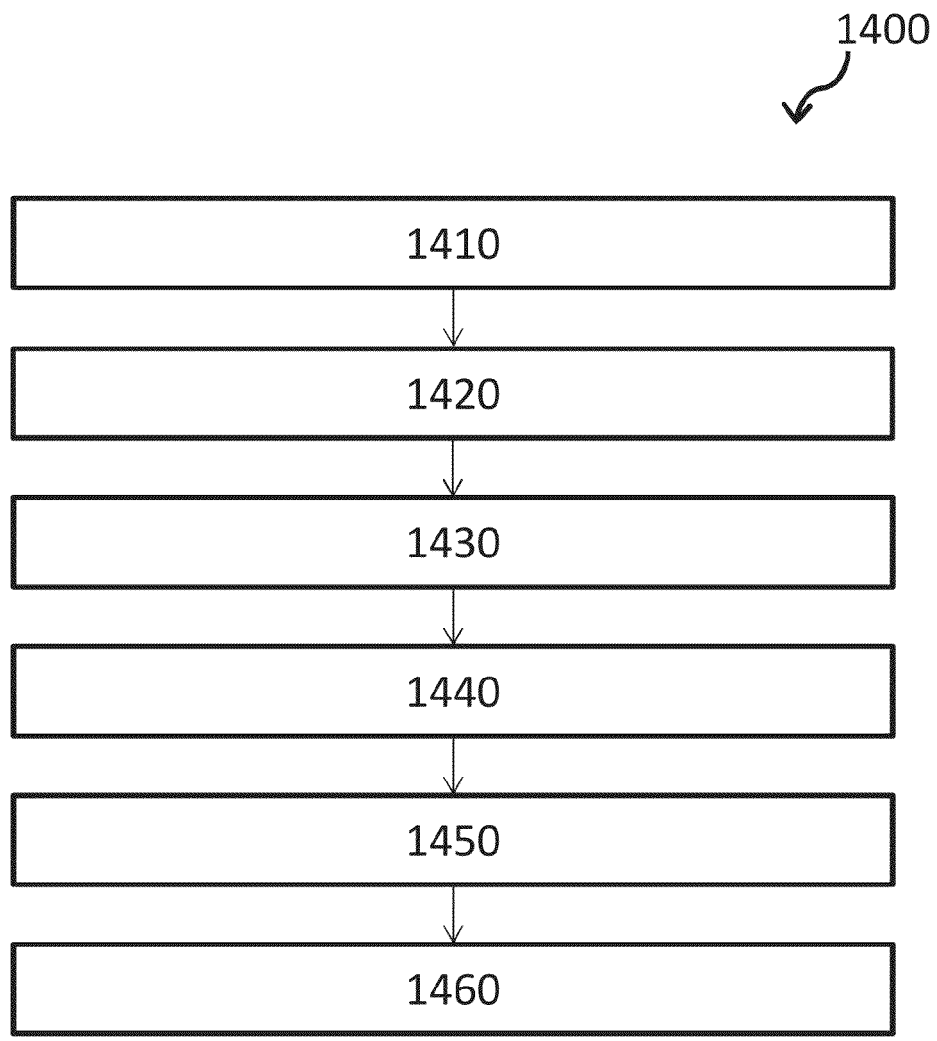
FIG. 14 shows a flowchart of a computer-implemented method to process an IR image based on a swipe gesture, in accordance with an embodiment of the disclosure.

Turning to FIG. 14, a flowchart is illustrated of a computer-implemented method 1400 to process an IR image based on a swipe gesture, in accordance with an embodiment of the disclosure. For example, method 1400 may process and/or display IR images based on one or more temperature ranges that may be adjusted, updated, or otherwise modified by processing swipe gestures as illustrated in the examples of FIGS. 10a-13b. In various embodiments, method 1400 may comprise the following:

At block 1410, displaying an IR image on a touch screen, based on a temperature range. For example, according to some embodiments, the IR image may be processed and displayed on the touch screen by applying a first palette to IR image data values within the temperature range and applying a second palette to IR image data values outside said temperature range. In some embodiments, the IR image may be displayed within a first graphical object (e.g., graphical object 1010) displayed on the touch screen. In some embodiments, the first graphical object may belong to a first set of graphical objects that do not overlap each other when displayed within the touch screen.

At block 1420, displaying a second graphical object (e.g., graphical object 1016) within said touch screen. For example, the second graphical object may comprise a scale, legend, or other graphical representation of the temperature range, based on which the IR image was applied selected palettes. The second graphical object may comprises one or more portions each associated with a temperature value (e.g., a maximum, a middle, and a minimum temperature value) from the temperature range represented in the second graphical object. In some embodiments, the second graphical object may belong to a second set of graphical objects that can be overlapped or overlaid on the first set of graphical objects (e.g., including the IR image) when displayed within the touch screen.

At block 1430, receiving, by a processor communicatively coupled to said touch screen, a user indication of a swipe gesture via said touch screen, wherein said receiving the user indication comprises generating first data representing a swipe gesture starting location and second data representing a swipe gesture direction. Block 1430 may further comprise determining whether the swipe gesture starting location represented by first data corresponds to a coordinate associated with a selected portion of the second graphical object. For example, said swipe gesture starting location may be determined as corresponding to one of a first portion representing a minimum temperature value of the temperature range, a second portion representing a middle temperature value of the temperature range, and a third portion representing a maximum temperature value of the temperature range.

At block 1440, adjusting, updating, or otherwise modifying said temperature range based on said first data and said second data representing the user indication of the swipe gesture. For example, in various embodiments, modifying said temperature range may comprise lowering or raising one or more of a minimum temperature value, a middle temperature value, and a maximum temperature value of said temperature range represented in the second graphical object, based on the swipe gesture directions and on which portion of the second graphical object the swipe gesture starting location corresponds to, as described above in connection with the examples of FIGS. 11a-13b.

At block 1450, image processing said IR image based on said modified temperature range. In the example discussed above in connection with block 1410, the IR image may be processed by applying the first palette to IR image data values now within the modified temperature range and applying the second palette to IR image data values now outside the modified temperature range, according to some embodiments. In other examples, one or more additional or alternative imaging processing operations that are dependent on or associated with the temperature range may be performed on the IR image with the now modified temperature range.

At block 1460, displaying said image processed IR image within said touch screen. Thus, for example, the IR image may be displayed that is updated or modified by performing imaging processing with the modified temperature range based on the processing of the swipe gesture. In this way, for example, users may use swipe gestures and view correspondingly updated IR images to quickly and conveniently discover and apply desired temperature ranges for processing and/or presenting IR images.

In one or more embodiments, the temperature range may be selected from the temperature ranges D-F described in relation to FIG. 9. In one or more embodiments, said second set of graphical objects may be overlappingly placed or overlaid on the first graphical object at the top part, bottom part, right part or left part of said first graphical object. For example, the second set of graphical objects may include a legend placed at the top part, bottom part, right part or left part of the displayed IR image.

In one or more embodiments, said second set of graphical objects may further comprise one or more additional graphical objects. For example, the second set of graphical objects may comprise a graphical representation of one or more additional temperature ranges (e.g., the temperature ranges D and F described in relation to FIG. 9 above), and a user may start a swipe gesture starting at a coordinate associated with a selected one of the graphical objects representing the temperature ranges to adjust a desired one of the temperature ranges.

Visualizing Temperature Using a Stationary Swipe Gesture

When image processing, presenting, analyzing, and monitoring an IR image of an observed real world scene, a spot marker may be overlaid onto or otherwise displayed relative to a displayed IR image to aid a user in marking or otherwise selecting a particular pixel or group of pixels of the displayed IR image. A user may mark or select a particular pixel or group of pixels using the spot marker so as to obtain one or more attributes associated with, or to control processing, presenting, and/or analyzing of an IR image based on, the marked pixel or group of pixels of the IR image. For example, the IR image may be processed to read out an IR image data value or temperature associated with the particular pixel or group of pixels marked or selected using the spot marker. It may therefore be beneficial to reduce complexity and time for a user to obtain desired attributes of, or control processing, presenting, and/or analyzing of, an IR image through the use of a spot marker or other similar means.

By conveniently obtaining attributes (e.g., temperature values) associated with IR images or conveniently controlling image processing and/or presentation of IR images, users of a computer system (e.g., an IR camera system or other computer system configured for thermographic use) may be able to quickly analyze particular aspects or details of the IR images and/or to discover a presentation of the IR images having improved interpretability. For example, for a user to understand the captured observed real worlds scene, it is further advantageous to be able to place a spot marker on a particular pixel or group of pixels of the displayed IR image and to be able to read out an IR image data value or temperature representative of a particular pixel or group of pixels, wherein the IR image data values represents infrared radiation emitted from an observed real world scene.

FIG. 15*a* and FIG. 15*b* show touch screen images illustrating an example of how a user indication of a swipe gesture, such as a stationary swipe gesture or a tap gesture, may be received to place or otherwise control a spot marker and present an attribute associated with an IR image, in accordance with an embodiment of the disclosure. In the example of FIGS. 15*a* and 15*b*, a user indication may be received of a stationary swipe gesture or tap gesture, which may be defined by a swipe gesture starting location 1530 (indicated using a cross mark for illustration purposes in the figures) and a swipe gesture ending location 1550 (indicated using a circle for illustration purposes in the figures) being equal or substantially equal (e.g., when differences fall within a specified small margin) as discussed in connection with FIGS. 7*a* and 7*b* above. In response, a graphical object 1511, e.g., a cross hair, hash symbol, or other similar graphical representations, may be displayed to represent a spot marker placed at a location corresponding to the swipe gesture starting location 1530 or ending location 1550, for example. Graphical object 1511 may be overlaid onto graphical object 1010 containing an IR image.

This example further illustrates that an attribute (e.g., a temperature value, emissivity value, or other IR image attributes) associated with the IR image at the stationary swipe gesture location (e.g., swipe gesture starting location 1530 or ending location 1550) may be determined (e.g., based on a single IR image data value or a combination of IR image data values) and presented in a graphical object 1512, according to some embodiments. The presentation may be numeric information representing image data values, e.g., in degrees Celsius as shown in FIG. 12*b*, degrees Fahrenheit, or emissivity. Graphical object 1512 may be overlaid onto graphical object 1010 containing the IR image, at a predefined location relative to graphical object 1010, for example. In some embodiments, graphical objects 1010 and 1020 may be managed in a first set of non-overlapping graphical objects, whereas graphical objects 1511 and 1512 may be managed in a second set of graphical objects that may overlap with or be overlaid onto objects in the first set, as discussed above in connection with FIGS. 10*a* and 10*b*.

Figure 16B:
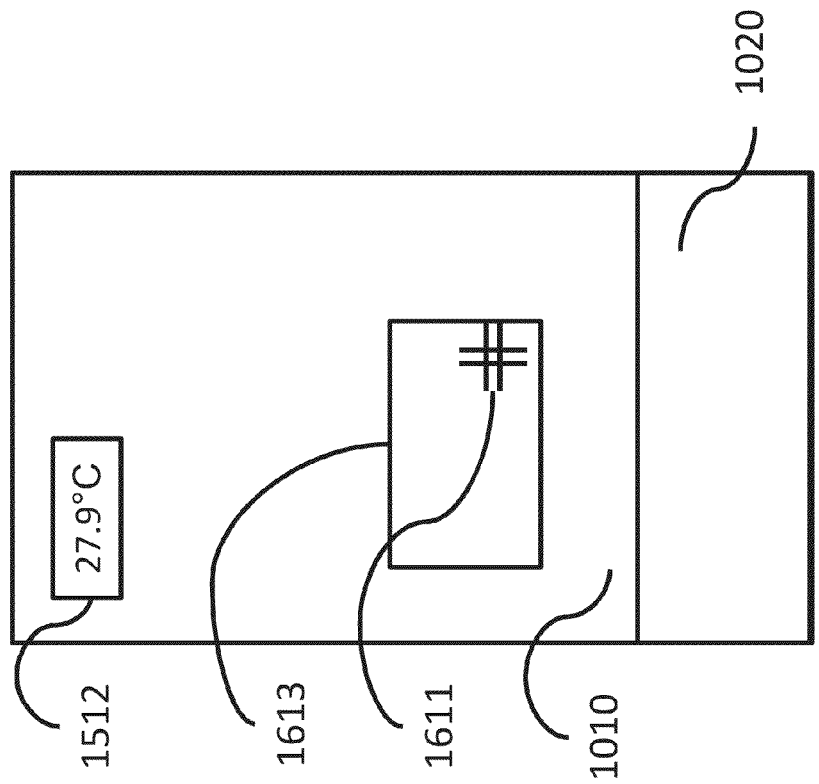
Figure 16A:
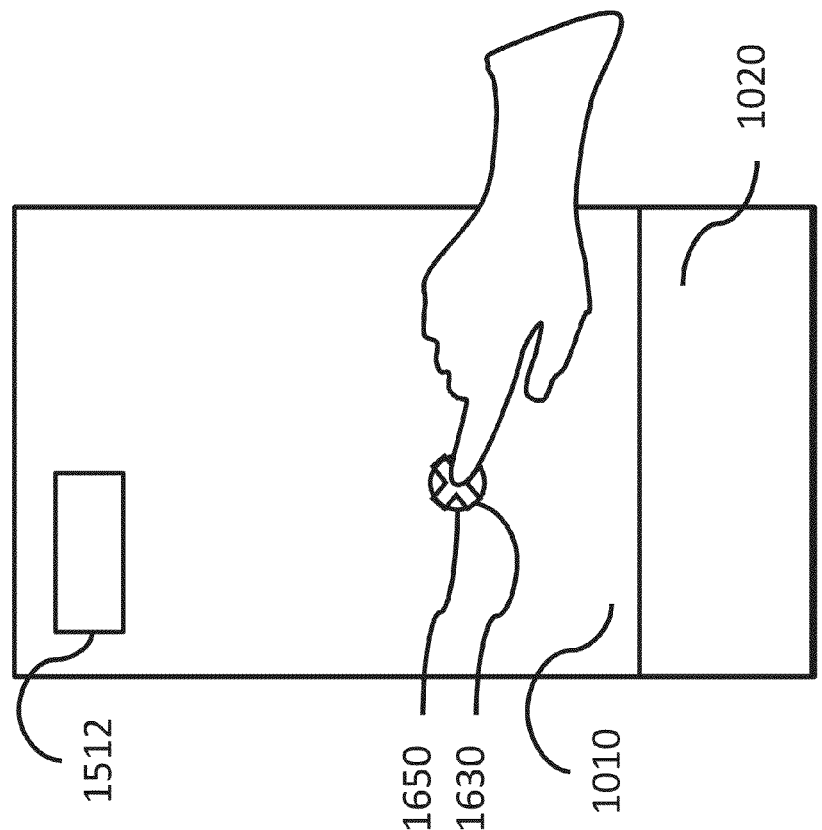

FIG. 16*a* and FIG. 16*b* illustrate another example of how a user indication of a swipe gesture, such as a stationary swipe gesture or a tap gesture, may be received to place a spot marker and present an attribute associated with an IR image, in accordance with an embodiment of the disclosure. In this example, in response to receiving a stationary swipe gesture or a tap gesture (defined by a swipe gesture starting location 1630 and ending location 1650 being equal or substantially equal), a rectangular area 1613 may be selected based on the stationary swipe gesture location (e.g., swipe gesture starting location 1630 or ending location 1650). In some embodiments, edges of rectangular area 1613 may be displayed as a graphical object overlaid onto graphical object 1010 containing the IR image, so as to aid the user in identifying the selected area. Depending on embodiments, the stationary swipe gesture location may determine the center of rectangular area 1613, a corner of rectangular area 1613, or other predefined location relative to rectangular area 1613. Some embodiments may allow the user to adjust rectangular area 1613 via a swipe gesture or a dragging gesture starting on a corner or edge of rectangular area 1613.

In the example illustrated in FIGS. 16*a* and 16*b*, a spot marker location is determined based on the IR image data values (e.g., pixel values) for pixels of the displayed IR image within rectangular area 1613. In some embodiments, the spot maker location is selected by a predefined function (also referred to herein as a spot marker function) over the pixels within rectangular area 1613. For one or more examples, the spot marker function may be a minimum image data value function (e.g., a function that returns a location of a pixel that has the minimum image data value over all pixels within rectangular area 1613) or a maximum image data value function (e.g., a function that returns a location of a pixel that has the maximum image data value over all pixels within rectangular area 1613).

The determined spot marker location may be indicated by a graphical object 1611 overlaid onto graphical object 1010 containing the IR image. Graphical object 1611 may be displayed at a location corresponding to the determined spot marker location, but may otherwise be similar to graphical object 1511. Further, according to some embodiments, an attribute (e.g., a temperature value, emissivity value, or other IR image attributes) associated with the determined spot marker location may be presented in graphical object 1512, in a similar manner as described above for FIGS. 15*a* and 15*b*. Thus, for example, in embodiments where the spot marker function may be a minimum image data value function or a maximum image data value function for IR image data, a cold or a hot spot within rectangular area 1613 may be indicated by graphical object 1611 and a corresponding temperature value may be presented as a numerical value in graphical object 1512.

FIG. 17*a* and FIG. 17*b* illustrate another example of how a user indication of a swipe gesture, such as a stationary swipe gesture or a tap gesture, may be received to place a spot marker (represented by a graphical object 1711) and present an attribute associated with an IR image, in accordance with an embodiment of the disclosure. The example illustrated in FIGS. 17a and 17b shows a circular area 1713 rather than rectangular area 1613 as the area selected in response to receiving a stationary swipe gesture (e.g., defined by a swipe gesture starting location 1730 and ending location 1750), but may otherwise be similar to the example illustrated in FIGS. 16a and 16b. Although rectangular area 1613 and circular area 1713 are illustrated as examples of areas selected in response to a stationary swipe gesture for embodiments described in connection with FIGS. 16a-17b, areas in other shapes are also contemplated as variations within those embodiments.

Figure 18:
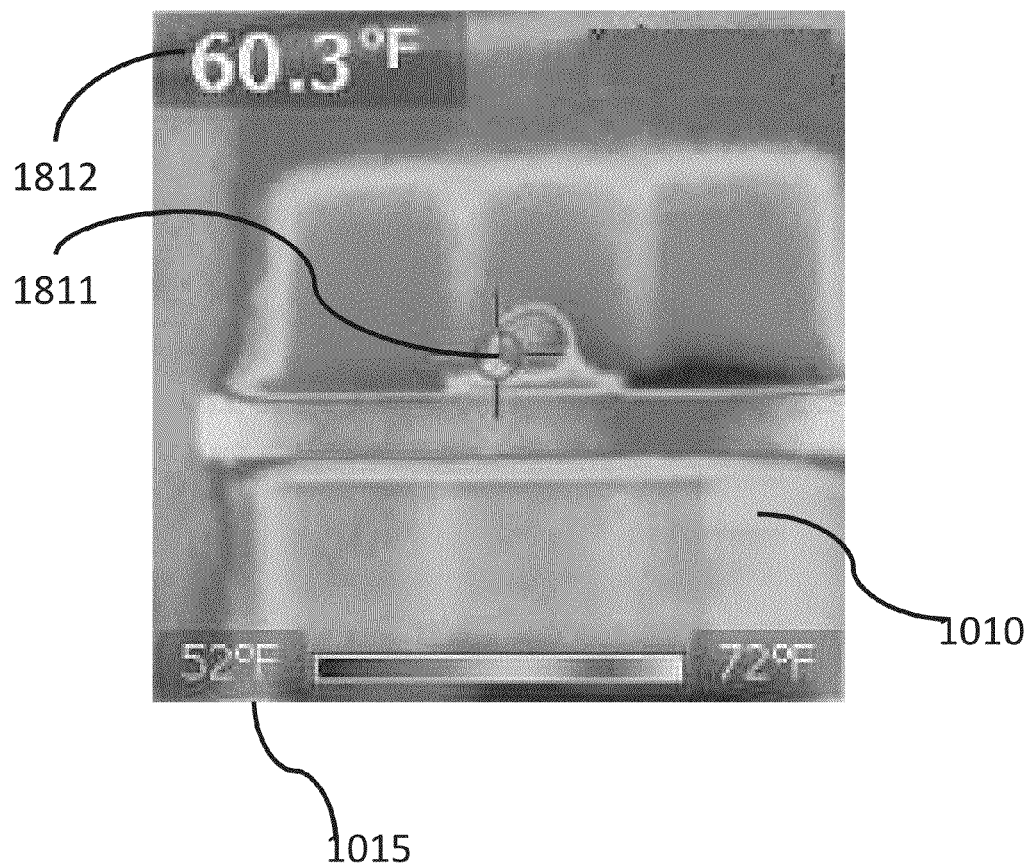
FIG. 18 shows an example touch screen image displaying an IR image and a spot marker, in accordance with one or more embodiments of the disclosure.

FIG. 18 shows an example touch screen image displaying an IR image and a spot marker, in accordance with the various embodiments discussed in connection with FIGS. 10a-17b above. In this example image, a graphical object 1811 in the form of a cross hair or hash symbol is displayed at a location corresponding to the spot marker location, and a temperature value associated with the spot marker location is displayed in a graphical object 1812 as numerical information in degrees Fahrenheit.

Figure 19:
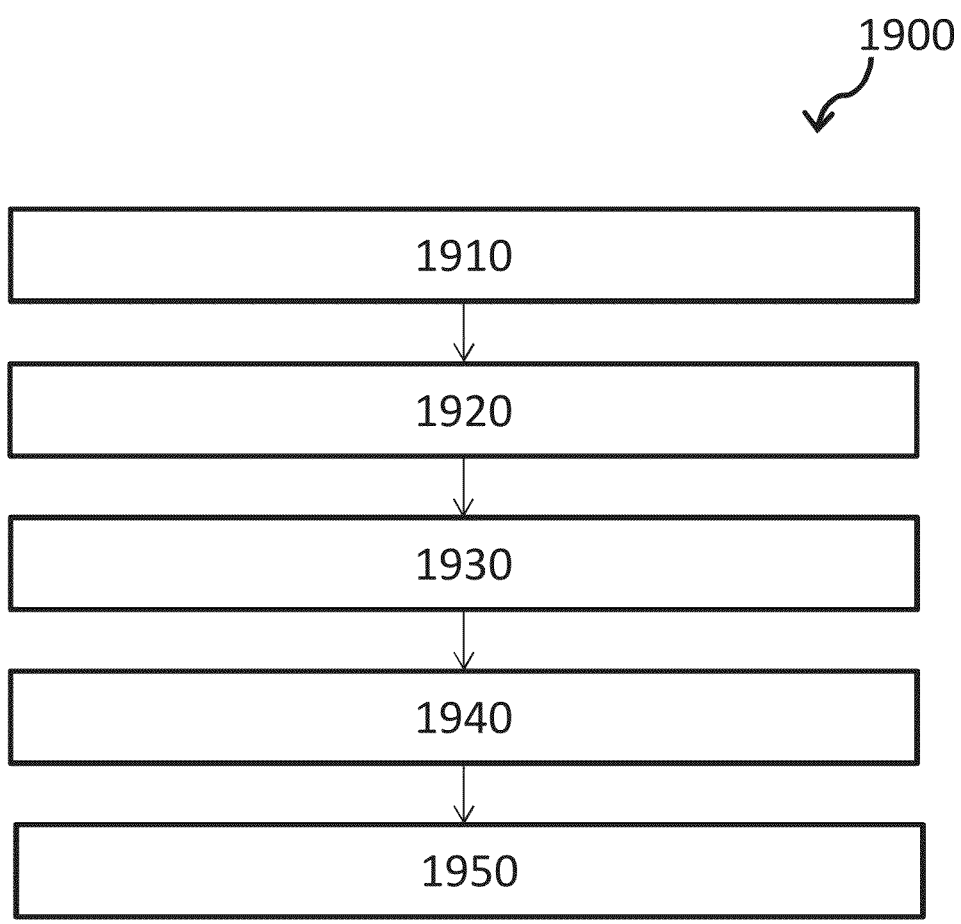
FIG. 19 shows a flowchart of a computer-implemented method to process an IR image based on a swipe gesture, in accordance with an embodiment of the disclosure.

Turning to FIG. 19, a flowchart is illustrated of a computer-implemented method 1900 to process an IR image based on a swipe gesture, in accordance with an embodiment of the disclosure. For example, method 1900 may process swipe gestures to place or otherwise control a spot marker on a displayed IR image and to obtain one or more attributes (e.g., a temperature value) associated with the IR image as illustrated in the examples of FIG. 15a-17b. In some embodiments, method 1900 may control processing, presenting, and/or analyzing of the IR image based on the spot marker location, in addition to or in place of obtaining an attribute such as a temperature value of the IR image at a location corresponding to the spot marker. For example, according to some embodiments, one or more temperature values (e.g., a minimum temperature value, a middle temperature value, and a maximum temperature value) of the temperature ranges D-F of FIG. 9 may be set or adjusted based on an image data value of the IR image at the spot marker location, which in turn may affect processing, presenting, and/or analyzing of the IR image. In various embodiments, method 1900 may comprise the following:

At block 1910, displaying an IR image on a touch screen. For example, according to some embodiments, the IR image may be processed and displayed on the touch screen by applying a first palette to IR image data values of the IR image. In some embodiments, the IR image may be displayed within a first graphical object (e.g., graphical object 1010) displayed on the touch screen. In some embodiments, the first graphical object may belong to a first set of graphical objects that do not overlap each other when displayed within the touch screen.

At block 1920, receiving, by a processor communicatively coupled to said touch screen, a user indication of a swipe gesture via said touch screen, wherein said receiving the user indication comprises generating first data representing a swipe gesture starting location and second data representing a swipe gesture direction. In some embodiments, block 1920 may also comprise determining whether the received user indication corresponds to a stationary swipe gesture or a tap gesture. Depending on embodiments, such determination may be made when the swipe gesture starting location equals or substantially equals (e.g., when differences fall within a small range) a swipe gesture ending location and/or based on the swipe gesture direction (e.g., when no or negligible swipe gesture direction is detected). Block 1920 may further involve associating the swipe gesture starting location with a coordinate within the first graphical object (e.g., within graphical object 1010 containing the IR image).

At block 1930, determining a spot marker location, in response to receiving a user indication corresponding to a stationary swipe or tap gesture. In some embodiments, the spot marker location may be determined relative to the swipe gesture starting location or the swipe gesture ending location of the stationary swipe gesture. For example, the spot marker location may be set as the swipe gesture starting location (or the ending location, which may be the same or substantially the same as the starting location for a stationary swipe gesture). In some embodiments, the stationary swipe gesture may define a selected area (e.g., rectangular area 1613 or circular area 1713) rather than the spot marker location, as discussed above in connection with FIGS. 16a-17b. In such embodiments, the spot marker location may then be determined based on processing of IR image data values (e.g., pixel values) for pixels of the IR image within the selected area defined by the stationary swipe gesture, as discussed above in connection with FIGS. 16a-17b. Such processing of IR image data values may involve applying a spot marker function such as a minimum image data value function, a maximum image data value function, or other functions over aggregate IR image data values for pixels within the selected area, as discussed herein above.

At block 1940, displaying a second graphical object (e.g., graphical object 1511, 1611, 1711, or 1811) including a cross hair, a hash symbol, or other graphical representation of a spot marker at the spot marker location. For example, the second graphical object representing a spot marker may be overlaid onto the first graphical object displaying the IR image, at a location corresponding to the spot marker location in the displayed IR image. In some embodiments, the second graphical object may belong to a second set of graphical objects that can be overlapped or overlaid on the first set of graphical objects (e.g., the displayed IR image) when displayed within the touch screen. In some embodiments, block 1940 may also involve overlaying a third graphical object representing the contour or edges of the selected area (e.g., rectangular area 1613 or circular area 1713) onto the first graphical object containing the IR image.

At block 1950, processing the IR image based on the spot marker location. In one or more embodiments, this may include obtaining an attribute (e.g., a temperature value) associated with a pixel or group of pixels of the IR image, where the pixel or group of pixels is selected based on the spot marker location, as discussed above in connection with the examples of FIGS. 15a-18 above. In some embodiments, the obtained attribute may be presented in a fourth graphical object (e.g., graphical object 1512), which may for example be overlaid on the first graphical object containing the IR image. In one example, the fourth graphical object may contain a numerical representation of the obtained attribute, such as the temperature values in degrees Celsius or Fahrenheit.

Expanding or Minimizing a Legend Using a Swipe Gesture.

When image processing, presenting, analyzing, and monitoring an IR image of an observed real world scene, the requirement of the relative sizes of graphical objects, e.g., between the displayed image and the legend, may be adjusted as necessary. For example, in some handheld infrared imaging devices, the display area may be limited, and it may thus be advantageous to present some graphical objects such as a legend or a menu selectively in an expanded or minimized form.

Figure 20B:
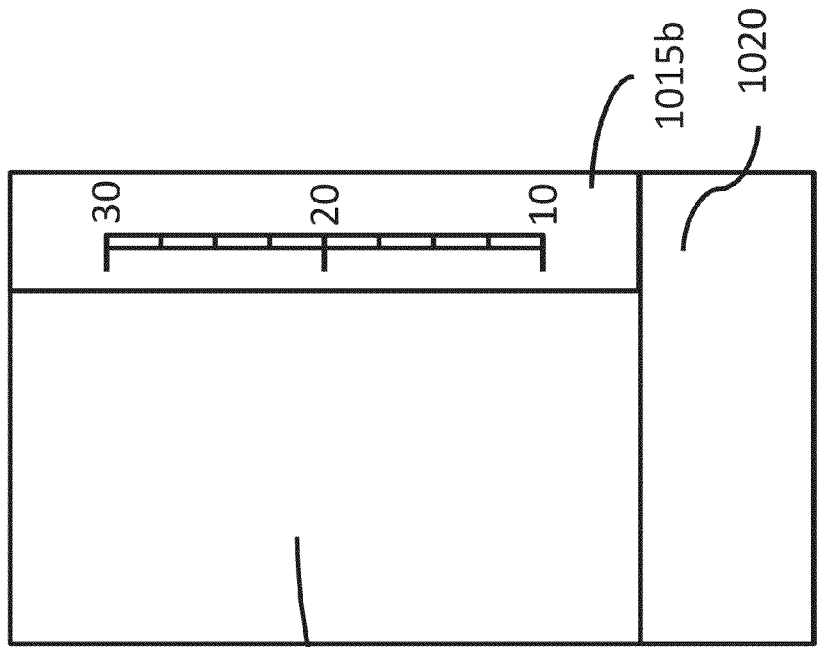
FIGS. 20a and 20b show touch screen images illustrating an example of how a size of a graphical object may be adjusted based on a swipe gesture, in accordance with an embodiment of the disclosure.
Figure 20A:
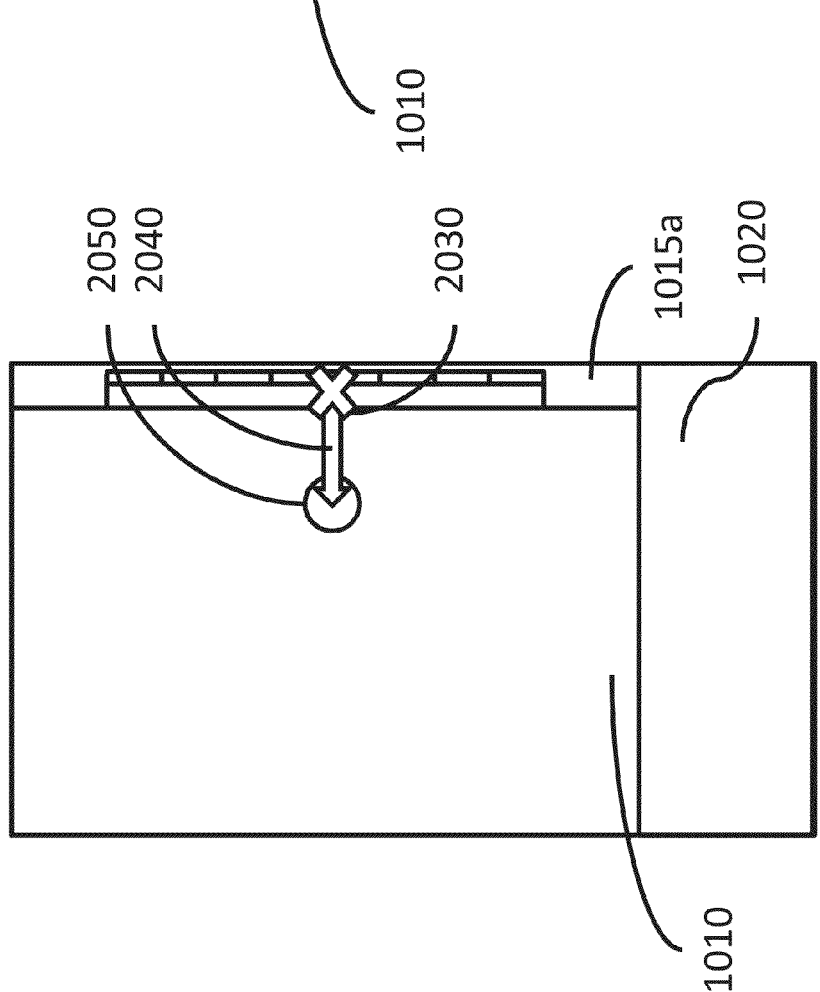

FIG. 20a and FIG. 20b show touch screen images illustrating an example of how a size of a graphical object may be adjusted based on a swipe gesture, in accordance with an embodiment of the disclosure. FIG. 20a shows a graphical object in a reduced or minimized form 1015a, whereas FIG. 20b shows the same graphical object in an expanded or full form 1015b. In this example, the graphical object representing a legend may be switched from its reduced or minimized form 1015a to its expanded or full form 1015b in response to receiving a swipe gesture having a swipe gesture starting location 2030, a swipe gesture direction 2040, and a swipe gesture ending location 2040 as shown in FIG. 20a.

In particular, the swipe gesture starting location 2030 may correspond to a coordinate associated with the graphical object in its reduced or minimized form 1015a, with the swipe gesture direction 2040 corresponding to an approximate direction in which the graphical object is to be expanded and the swipe gesture ending location 2060 corresponding to a coordinate outside a predefined threshold (e.g., to indicate a confirmation of a switch to an expanded form). Conversely, by receiving and processing a user indication of a swipe gesture starting on the graphical object in its expanded or full form 1015b, with a swipe direction corresponding to an approximate direction in which the graphical object is to be reduced or minimized and a swipe ending location being past a predefined threshold, the graphical object in its expanded or full form 1015b may be switched to its reduced or minimized form 1015a.

Figure 21:
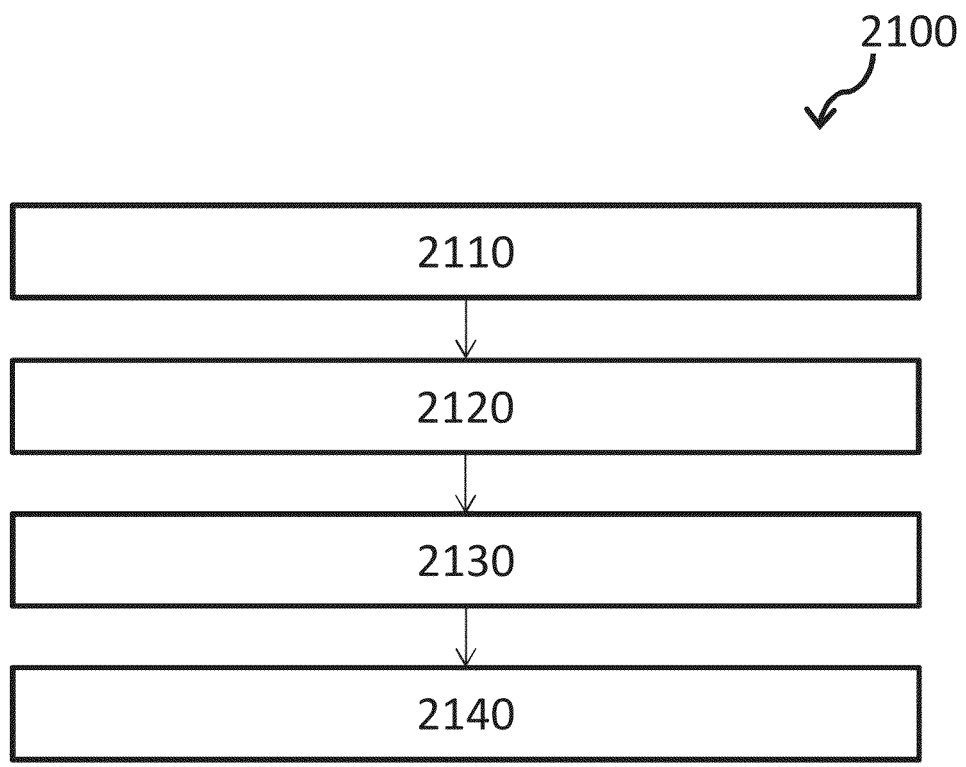
FIG. 21 show a flowchart of a computer-implemented method to process graphical objects displayed on a touch screen based on a swipe gesture, in accordance with an embodiment of the disclosure.

FIG. 21 illustrates a flowchart of a computer-implemented method 2100 to process graphical objects displayed on a touch screen based on a swipe gesture, in accordance with an embodiment of the disclosure. For example, method 2100 may process graphical objects displayed, including an IR image and a graphical representation of a legend or menu, to adjust the relative sizes of the graphical objects in response to receiving a swipe gesture. In various embodiments, method 2100 may comprise the following:

At block 2110, displaying an IR image on a touch screen. For example, the IR image may be processed and displayed within a first graphical object (e.g., graphical object 1010) displayed on the touch screen. In some embodiments, the first graphical object may belong to a first set of graphical objects that do not overlap each other when displayed within the touch screen. In some embodiments, the IR image may be processed and displayed by applying a first palette to IR image data values within a first temperature range and applying a second palette to IR image data values outside said first temperature range.

At block 2120, displaying a second graphical object within said touch screen, where the second graphical object may be displayed either in its first form (e.g., reduced or minimized form 1015a) or in its second form (e.g., expanded or full form 1015b). For example, the second graphical object may comprise a scale, legend, or other graphical representation of the first temperature range, based on which the IR image was applied selected palettes. In some embodiments, the second graphical object may belong to a second set of graphical objects that can be overlapped or overlaid on the first set of graphical objects (e.g., the displayed IR image) when displayed within the touch screen.

At block 2130, receiving, by a processor communicatively coupled to said touch screen, a user indication of a swipe gesture via said touch screen, wherein said receiving the user indication comprises generating first data representing a swipe gesture starting location and second data representing a swipe gesture direction. In some embodiments, block 2130 may further comprise determining whether the first swipe gesture starting location represented by the first data corresponds to a coordinate associated with the second graphical object and whether the swipe gesture direction represented by the second data corresponds to one of predefined directions associated with an indication to adjust the size of the second graphical object.

At block 2140, modifying said second graphical object based on said first data and said second data, wherein modifying said second graphical object comprises modifying the size of the second graphical object to its first form (e.g., reduced or minimized form 1015a) or to its second form (e.g., expanded or full form 1015b). For example, the size of the second graphical object may be changed from its predefined reduced or minimized size to its predefined expanded or full size, or vice-versa, based upon a determination that the first data representing the swipe gesture starting location corresponds to a coordinate associated with the second graphical object and that the second data representing the swipe gesture direction corresponds to one of predefined directions associated with an indication to adjust the size of the second graphical object.

Adjusting Multiple Parameter Ranges Using Spatial Separation on the Touch Screen As discussed, processing, presenting, analyzing, and monitoring of an IR image of an observed real world scene are often dependent on multiple parameters that control the image processing of a visual representation of the IR image. It may therefore be beneficial to reduce complexity and time for a user to adjust a plurality of parameters that control a visual representation of an IR image, in particular in a computer system configured with a touch screen with a touch-based user input functionality. By conveniently viewing and controlling multiple parameters that affect how IR images are processed and presentated, users of a computer system (e.g., an IR camera system or other computer system configured for thermographic use) may be able to quickly obtain a presentation of the IR images having improved interpretability and/or showing particular aspects or details that may be analyzed.

FIG. 22a and FIG. 22b show touch screen images illustrating an example of how a swipe gesture from a user may be received to adjust one of a plurality of parameters that control or affect processing and/or presentation of an IR image, in accordance with an embodiment of the disclosure. In the example of FIGS. 22a and 22b, an IR image may be displayed within graphical object 1010 as discussed above. Additional graphical objects, such as graphical object 1020 representing for example a menu, may also be displayed if desired. As discussed above, graphical objects 1010 and 1020 may be managed in a first set of non-overlapping graphical objects according to one or more embodiments.

In this example, two parameters are each graphically represented in graphical objects 22151 and 22152, respectively. Additional parameters may be displayed in additional graphical objects if desired, without departing from the scope and spirit of the present disclosure. The parameters in this example each define a range of parameter values, and may be presented as a scale or legend (as shown in FIGS. 22a and 22b) or other graphical representation that corresponds to the range of parameter values. According to some embodiments, graphical objects 22151 and 22152 may overlap or be overlaid onto graphical object 1010 displaying the IR image. In this regard, graphical objects 22151 and 22152 may be managed in a second set of graphical objects that may overlap with objects in the first set of graphical objects, according to one or more embodiments.

According to various embodiments, one or more portions of graphical object 22151 may each be associated with a parameter value from the range of parameter values represented in graphical object 22151. In one example, graphical object 22151 may comprise a first portion 22161 associated with a minimum parameter value, a second portion 22171 associated with a middle parameter value, and a third portion 22181 associated with a maximum parameter value of the parameter range represented in graphical object 22151. Similarly, graphical object 22152 may comprise a first portion 22162 associated with a minimum parameter value, a second portion 22172 associated with a middle parameter value, and a third portion 22182 associated with a maximum parameter value of the parameter range represented in graphical object 221521. In other examples, graphical objects 22151 and/or 22152 may comprise fewer than the three portions identified in the previous example. That is, for example, there may be just one portion associated with a parameter value (e.g., a portion associated with a middle parameter value), or there may just two portions (e.g., two portions each associated with a maximum and a minimum parameter value). In yet other examples, graphical object 1016 may comprise additional portions that correspond to additional parameter values from the parameter range.

According to various embodiments, a user that wishes to adjust one of the parameter ranges represented in graphical objects 22151 and 22152 may apply a gesture motion on an appropriate one of graphical objects 22151 and 22152 to do so. For example, via an appropriate gesture motion on graphical object 22151/22152, a user may modify only the minimum value or only the maximum value, or simultaneously modify any combination of the minimum value, the maximum value, and the middle value of the parameter range. As a non-limiting example, this may involve starting a swipe gesture on the first portion 22161/22162, the third portion 22181/22182, or the second portion 22171/22172 of graphical object 22181/22182. The example of FIGS. 22*a* and 22*b* shows that a downward swipe gesture starting on the first portion 22161 of graphical object 22151 may be received and processed to lower the minimum parameter value from 0.3. to 0, which in turn may lower the middle parameter value of the parameter range. According to various embodiments, the minimum temperature value may be raised, instead of being lowered, if the swipe gesture direction is an upward direction instead of the downward direction as given in this example.

It should be noted that graphical objects 22151 and/or 22152 are shown to include a scale with numerical indications of parameter values (e.g., corresponding to maximum, middle, and minimum parameter values) only as an example, and that graphical objects 22151 and/or 22152 may alternatively or additionally include any other suitable graphical representation of a desired parameter range, and may or may not include numerical indications, depending on particular applications of the disclosure. Further, although the parameters in the example of FIGS. 22*a* and 22*b* are shown to comprise a range of parameter values, the techniques disclosed herein may also be applied to parameters that comprise discrete values (e.g., including binary values such as on/off or yes/no). For example, a swipe gesture starting on a particular portion of a graphical object representing a parameter may be processed to adjust one or more discrete values of the parameter.

FIGS. 23*a* and 23*b* illustrate another example of how a swipe gesture from a user may be received to modify another parameter, in accordance with an embodiment of the present disclosure. The example of FIGS. 23*a* and 23*b* shows a downward swipe gesture on graphical object 22152 instead of graphical object 22151. Thus, in this example, the downward swipe gesture starting on the first portion 22162 of graphical object 22152 is received and processed to adjust the minimum value of the parameter range represented in graphical object 22152 from 30% to 0%, which in turn adjusts the middle value of the parameter range.

Figure 24:
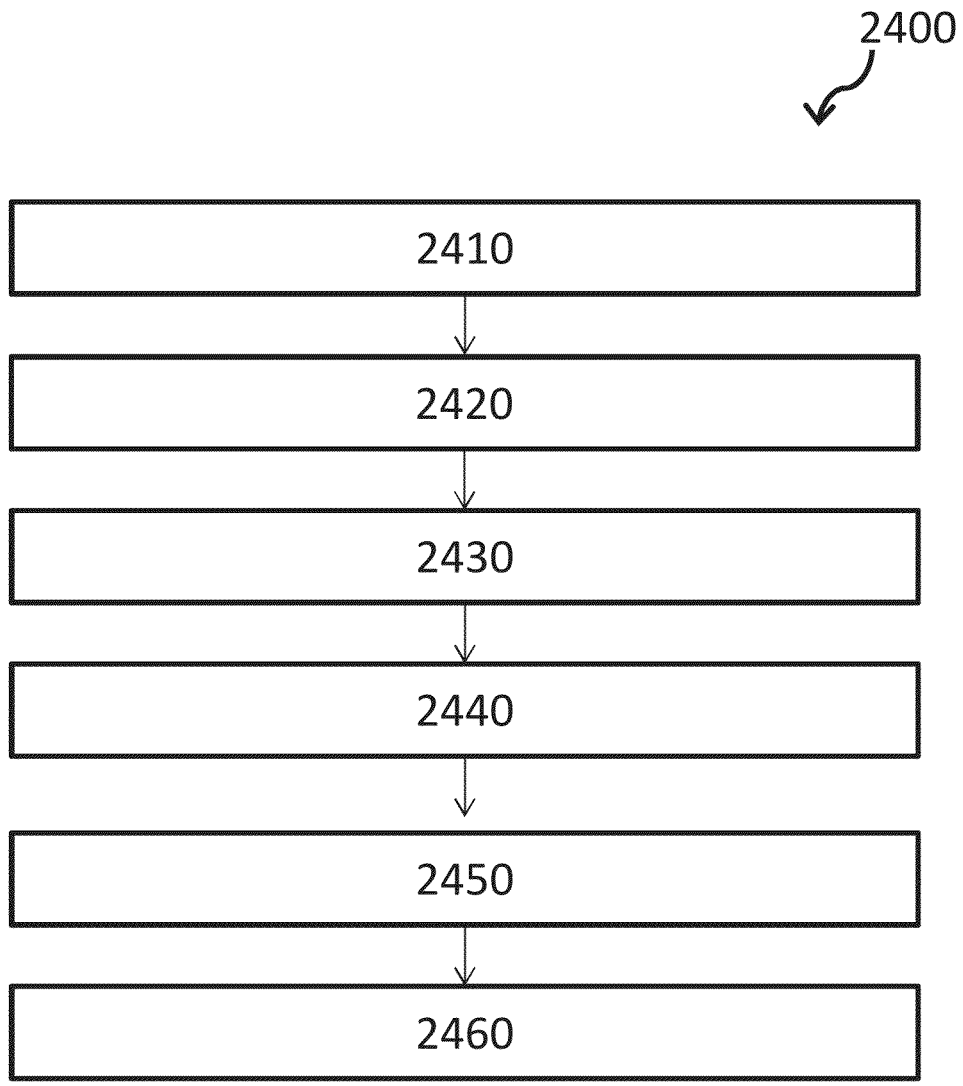
FIG. 24 shows a flowchart of a computer-implemented method to process an IR image based on a swipe gesture, in accordance with an embodiment of the disclosure.

FIG. 24 shows a flowchart of a computer-implemented method 2400 to process an IR image based on a swipe gesture, in accordance with an embodiment of the disclosure. For example, method 2400 may process and/or display IR images based on a plurality of parameter ranges that may be adjusted, updated, or otherwise modified by processing swipe gestures as illustrated in the examples of FIGS. 22*a*-23*b*. In various embodiments, method 2400 may comprise the following:

At block 2410, displaying an IR image on a touch screen based on a first parameter range and a second parameter range. For example, according to some embodiments the IR image may be processed based on the first and the second parameter ranges, and displayed within a first graphical object (e.g., graphical object 1010) displayed on the touch screen. In some embodiments, the first graphical object may belong to a first set of graphical objects that do not overlap each other when displayed within the touch screen.

At block 2420, displaying a second graphical object (e.g., graphical object 22151) and a third graphical object (e.g., graphical object 22152) within said touch screen. For example, the second and the third graphical objects may each comprise a scale, legend, or other graphical representation of the first and the second parameter ranges, respectively. In some embodiments, the second and the third graphical objects may belong to a second set of graphical objects that can be overlapped or overlaid on the first set of graphical objects (e.g., the displayed IR image) when displayed within the touch screen, At block 2430, receiving, by a processor communicatively coupled to said touch screen, a user indication of a swipe gesture via said touch screen, wherein said receiving the user indication comprises generating first data representing a swipe gesture starting location and second data representing a swipe gesture direction. Block 2430 may further comprise determining whether the swipe gesture starting location represented by first data corresponds to a coordinate associated with a selected portion of the second or the third graphical object. For example, said swipe gesture starting location may be determined as corresponding to a first portion, a second portion, or a third portion of the second or the third graphical object, where each portion is associated with a minimum parameter value, a middle parameter value, or a maximum parameter value of the first or the second parameter range.

At block 2440, adjusting, updating, or otherwise modifying said first or said second parameter range based on said first data and said second data representing the user indication of the swipe gesture. For example, in various embodiments, modifying said first or said second parameter range may comprise lowering or raising one or more of a minimum parameter value, a middle parameter value, and a maximum parameter value of said first or said second parameter range, based on the swipe direction and on which portion of the second or the third graphical object the swipe gesture starting location corresponds to, as illustrated in the examples of FIGS. 22*a*-23*b* and the corresponding text above.

At block 2450, image processing said IR image based on said the first or the second parameter range as modified, and at block 2460, displaying said image processed IR image within said touch screen. Thus, for example, the IR image may be displayed that is updated or modified by performing imaging processing with the first and/or the second parameter ranges that may have been modified according to the swipe gesture received from the user via the touch screen. In this way, for example, users may use swipe gestures and view correspondingly updated IR images to quickly and conveniently discover and apply desired parameter ranges for processing and/or presenting IR images.

Gesture Manipulation of an Infrared Imaging Device

In one or more embodiments, a gesture on a touchscreen may be received and processed to control infrared imaging device functionality. In one non-limiting example, any of the gestures including a tap, double tap, drag, flick, pinch, spread, press, press+tap, press+drag, or rotate may be received to control a function in an infrared imaging device, such as contrast adjustment, fusion, blending, contrast enhanced fusion, panorama stitching, global positioning system (GPS) functionality, laser illumination functionality, video control functionality, communication functionality, annotation functionality, focus and zoom functionality, insulation or moisture analysis functionality, or other functionality that may be provided on particular infrared imaging devices.

Aligning

Since the capturing of the infrared (IR) image and capturing of the visual light (VL) image is generally performed by different imaging systems of the thermal imaging device mounted in a way that the offset, direction and rotation around the optical axes differ. The optical axes between the imaging systems may be at a distance from each other and an optical phenomenon known as parallax distance error will arise. The optical axes between the imaging systems may be oriented at an angle in relation to each other and an optical phenomenon known as parallax pointing error will arise. The rotation of the imaging systems around their corresponding optical axes and an optical phenomenon known as parallax rotation error will arise. Due to these parallax errors the captured view of the real world scene, called field of view (FOV) might differ between the IR imaging system and the VL imaging system.

Since the capturing of the infrared (IR) image and capturing of the visible light (VL) image is generally performed by different imaging systems of the thermal imaging device with different optical systems with different properties, such as magnification, the captured view of the real world scene, called field of view (FOV) might differ between the imaging systems. The IR image and the VL image might be obtained with different optical systems with different optical properties, such as magnification, resulting in different sizes of the FOV captured by the IR sensor and the VL sensor.

In order to combine the captured IR and captured VL image the images must be adapted so that an adapted IR image and adapted VL image representing the same part of the observed real world scene is obtained, in other words compensating for the different parallax errors and FOV size. This processing step is referred to as registration of or alignment of the IR image and the VL image.

Registration or alignment can be performed according to any method known to a skilled person in the art.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Computer Readable Media

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

In one or more embodiments, a computer program product for processing an infrared (IR) image based on a swipe gesture comprising computer readable code configured to, when executed in a processor, perform any or all of the method steps described herein.

In one or more embodiments, a non-transitory computer readable memory or processing an infrared (IR) image based on a swipe gesture on which is stored computer readable code configured to, when executed in a processor, perform any or all of the method steps described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   displaying, on a touch screen, an image of a scene;
   partitioning the image into a first part and a second part in response to a user indication made on the touch screen;
   displaying the first part of the image in an infrared (IR) image mode using at least a portion of an IR image of the scene captured by an IR imaging sensor; and
   displaying the second part of the image in a non-IR image mode.

2. The method of claim 1, further comprising:
   detecting a swipe gesture made on the touch screen, wherein the detecting of the swipe gesture comprises periodically determining a current location of the swipe gesture; and
   continuously updating the partitioning and the displaying of the first and the second parts based on the periodically determined current location of the swipe gesture until an ending location of the swipe gesture is detected.

3. The method of claim 1, wherein the non-IR image mode comprises:
a visible light (VL) image mode that displays a corresponding part of the image using at least a portion of a VL image of the scene captured by a VL imaging sensor; or
a fusion image mode that displays a corresponding portion of the image using a combination of pixel data from the IR image and the VL image.

4. The method of claim 3, further comprising aligning the VL image with the IR image.

5. The method of claim 4, wherein the aligning of the VL and the IR images comprises compensating for a parallax error and/or a difference in field of view (FOV) between the VL and the IR images.

6. The method of claim 1, wherein the partitioning splits the image vertically along a line.

7. The method of claim 1, further comprising:
displaying, on the touch screen, a graphical object representing a temperature range for processing the IR image;
detecting a swipe gesture having a starting location corresponding to the graphical object;
modifying the temperature range based on the swipe gesture; and
processing the IR image based on the modified temperature range.

8. The method of claim 7, wherein the temperature range comprises a minimum temperature and/or a maximum temperature for presenting the IR image in color.

9. A system comprising:
an infrared (IR) imaging sensor configured to capture an IR image of a scene;
a touch screen; and
a processor communicatively coupled to the IR imaging sensor and the touch screen, the processor being configured to:
display, on the touch screen, an image of the scene,
partition the image into a first part and a second part in response to a user indication made on the touch screen,
display the first part of the image in an IR image mode using at least a portion of the IR image captured by the IR imaging sensor, and
display the second part of the image in a non-IR image mode.

10. The system of claim 9, wherein the processor is further configured to:
detect a swipe gesture made on the touch screen, wherein the detect the swipe gesture comprises periodically determining a current location of the swipe gesture; and
update continuously the partition and the display of the first and the second parts based on the periodically determined current location of the swipe gesture until an ending location of the swipe gesture is detected.

11. The system of claim 9, further comprising:
a first device comprising the IR imaging sensor;
a second device comprising the touch screen and a visible light (VL) imaging sensor configured to capture the VL image of the scene; and
wherein the non-IR image mode comprises:
a VL image mode that displays a corresponding part of the image using at least a portion of the VL image of the scene captured by the VL imaging sensor, or
a fusion image mode that displays a corresponding portion of the image using a combination of pixel data from the IR image and the VL image.

12. The system of claim 11, wherein the processor is configured to align the VL image with the IR image to compensate for a parallax error and/or a difference in field of view (FOV) between the VL and the IR images.

13. The system of claim 9, wherein the processor is configured to partition the image by splitting the image vertically along a line.

14. The system of claim 9, wherein the processor is further configured to:
display, on the touch screen, a graphical object representing a temperature range for processing the IR image, the temperature range comprising a minimum temperature and/or a maximum temperature for presenting the IR image in color;
detect a swipe gesture having a starting location corresponding to the graphical object;
modify the temperature range based on the swipe gesture; and
colorize the IR image based on the modified temperature range.

15. A non-transitory computer-readable medium storing instructions which, when executed by one or more processors of a device, causes the device to perform a method comprising:
displaying, on a touch screen, an image of a scene;
partitioning the image into a first part and a second part in response to a user indication made on the touch screen;
displaying the first part of the image in an infrared (IR) image mode using at least a portion of an IR image of the scene captured by an IR imaging sensor; and
displaying the second part of the image in a non-IR image mode.

16. The non-transitory computer-readable medium of claim 15, wherein the method further comprises: detecting a swipe gesture made on the touch screen, wherein the detecting of the swipe gesture comprises periodically determining a current location of the swipe gesture; and continuously updating the partitioning and the displaying of the first and the second parts based on the periodically determined current location of the swipe gesture until an ending location of the swipe gesture is detected.

17. The non-transitory computer-readable medium of claim 15, wherein the non-IR image mode comprises:
a visible light (VL) image mode that displays a corresponding part of the image using at least a portion of a VL image of the scene captured by a VL imaging sensor; or
a fusion image mode that displays a corresponding portion of the image using a combination of pixel data from the IR image and the VL image.

18. The non-transitory computer-readable medium of claim 17, wherein the method further comprises aligning the VL image with the IR image to compensate for a parallax error and/or a difference in field of view (FOV) between the VL and the IR images.

19. The non-transitory computer-readable medium of claim 15, wherein the partitioning splits the image vertically along a line.

20. The non-transitory computer-readable medium of claim 15, wherein the method further comprises:
displaying, on the touch screen, a graphical object representing a temperature range for processing the IR image, the temperature range comprising a minimum temperature and/or a maximum temperature for presenting the IR image in color;

detecting a swipe gesture having a starting location corresponding to the graphical object;
modifying the temperature range based on the swipe gesture; and
colorizing the IR image based on the modified temperature range.

* * * * *